(12) United States Patent
Kubota et al.

(10) Patent No.: US 11,561,373 B2
(45) Date of Patent: Jan. 24, 2023

(54) IMAGING LENS

(71) Applicant: TOKYO VISIONARY OPTICS CO., LTD., Tokyo (JP)

(72) Inventors: Yoji Kubota, Nagano (JP); Kenichi Kubota, Tokyo (JP); Hitoshi Hirano, Tokyo (JP); Hisao Fukaya, Tokyo (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 102 days.

(21) Appl. No.: 16/885,398

(22) Filed: May 28, 2020

(65) Prior Publication Data

US 2020/0292792 A1  Sep. 17, 2020

Related U.S. Application Data

(60) Division of application No. 16/251,153, filed on Jan. 18, 2019, now Pat. No. 10,996,443, which is a continuation of application No. 15/479,385, filed on Apr. 5, 2017, now Pat. No. 10,241,302.

(30) Foreign Application Priority Data

May 13, 2016  (JP) .................................. 2016-096676

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC ........ G02B 9/62; G02B 9/64; G02B 13/0045; G02B 13/02

USPC .................. 359/713, 754–757, 759–760
See application file for complete search history.

(56) References Cited

U.S. PATENT DOCUMENTS

| | | | |
|---|---|---|---|
| 5,398,135 A | 3/1995 | Ohashi | |
| 2014/0139931 A1 | 5/2014 | Kubota | |
| 2014/0184882 A1 | 7/2014 | Kazuhara et al. | |
| 2015/0070783 A1* | 3/2015 | Hashimoto | G02B 9/64 |
| | | | 359/708 |
| 2015/0103418 A1 | 4/2015 | Takato | |
| 2016/0004042 A1 | 1/2016 | Kubota et al. | |
| 2016/0011407 A1 | 1/2016 | Sun | |
| 2017/0031133 A1 | 2/2017 | Liu et al. | |
| 2017/0031134 A1 | 2/2017 | Liu et al. | |

(Continued)

FOREIGN PATENT DOCUMENTS

JP  2013-195587 A  9/2013

*Primary Examiner* — Jordan M Schwartz
(74) *Attorney, Agent, or Firm* — Hamre, Schumann, Mueller & Larson, P.C.

(57) ABSTRACT

An imaging lens includes a first lens; a second lens having positive refractive power; a third lens; a fourth lens; a fifth lens; and a sixth lens, arranged in this order from an object side to an image plane side with spaces in between each of the lenses. The second lens is formed in a shape of a meniscus lens near an optical axis thereof. The third lens has at least one aspheric surface. The fourth lens has at least one aspheric surface. The fifth lens is formed in a shape so that a surface thereof on the object side is convex toward the object side near an optical axis thereof. The sixth lens has two aspheric surfaces and the surface on the image plane side is convex toward the image plane side near an optical axis thereof. The second lens has a specific Abbe's number.

7 Claims, 21 Drawing Sheets

(56) References Cited

U.S. PATENT DOCUMENTS

| | | |
|---|---|---|
| 2017/0108665 A1* | 4/2017 | Huang ............... G02B 13/0045 |
| 2017/0123186 A1 | 5/2017 | Shin et al. |
| 2017/0199355 A1* | 7/2017 | Kitahara ................ G02B 13/06 |
| 2017/0285305 A1* | 10/2017 | Lai ............................ G02B 9/64 |
| 2017/0299846 A1 | 10/2017 | Lin et al. |
| 2017/0322397 A1* | 11/2017 | Lee ........................ G02B 13/06 |
| 2017/0357079 A1* | 12/2017 | Liao ................... G02B 13/0045 |
| 2017/0357081 A1* | 12/2017 | Dai .......................... G02B 9/64 |

* cited by examiner

IMAGING LENS

CROSS-REFERENCE TO RELATED APPLICATIONS

This is a divisional application of a prior application Ser. No. 16/251,153, filed on Jan. 18, 2019, pending, which is a continuation application of a prior application Ser. No. 15/479,385, issued on Mar. 26, 2019 as U.S. Pat. No. 10,241,302.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a cellular phone, a portable information terminal, or the like, a digital still camera, a security camera, a vehicle onboard camera, and a network camera.

In these years, in place of cellular phones that are intended mainly for making phone calls, so-called "smartphones", i.e., multifunctional cellular phones which can run various application software as well as a voice call function, have been more widely used. When application software is run on smartphones, it is possible to perform functions such as those of digital still cameras and car navigation systems on the smartphones. In order to perform those various functions, most models of smartphones include cameras.

Generally speaking, product groups of such smartphones are often composed according to specifications for beginners to advanced users. Among them, an imaging lens to be mounted in a product designed for the advanced users is required to have a high-resolution lens configuration so as to be also applicable to a high pixel count imaging element of these years, as well as a small size.

As a method of attaining the high-resolution imaging lens, there has been a method of increasing the number of lenses that compose the imaging lens. However, the increase of the number of lenses easily causes an increase in the size of the imaging lens. Therefore, the lens configuration having a large number of lenses has a disadvantage in terms of mounting in a small-sized camera such as the above-described smartphones. Accordingly, in development of the imaging lens, it has been necessary to attain high resolution of the imaging lens, while limiting the number of lenses that composes the imaging lens.

In recent years, with advancement of technology to attain a high pixel count of an imaging element, technology for manufacturing lenses has been also dramatically advanced. Therefore, it is achievable to produce a smaller sized imaging lens which is equivalent to a conventional imaging lens in terms of the number of lenses. On the other hand, in some cases, high optical performance of the imaging lens has been discussed in terms of the number of lenses that compose the imaging lens. Due to limitation on a space inside a camera to mount the imaging lens, while downsizing of the imaging lens is still important, it is getting even more important to achieve high resolution of the imaging lens.

In case of a lens configuration composed of six lenses, due to the large number of lenses of the imaging lens, it has high flexibility in design. In addition, it has potential to attain satisfactory correction of aberrations and downsizing of the imaging lens in a balanced manner, which is necessary for high-resolution imaging lenses. For example, Patent Reference has disclosed an imaging lens with the six-lens configuration as the conventional imaging lens.

Patent Reference: Japanese Patent Application Publication No. 2013-195587

The imaging lens described in Patent Reference includes a first lens that is positive and directs a convex surface thereof to an object side; a second lens that is negative and directs a concave surface thereof to an image plane side, a third lens that is negative and directs a concave surface thereof to the object side, a fourth and fifth lenses that are positive and direct convex surfaces thereof to the image plane side, and a sixth lens that is negative and directs a concave surface thereof to the object side. According to the conventional imaging lens disclosed in Patent Reference, by satisfying conditional expressions of a ratio between a focal length of the first lens and a focal length of the third lens and a ratio between a focal length of the second lens and a focal length of the whole lens system, it is achievable to satisfactorily correct a distortion and a chromatic aberration.

Each year, functions and sizes of cellular phones and smartphones are getting higher and smaller, and the level of a small size required for an imaging lens is even higher than before. In case of the imaging lens disclosed in Patent Reference, since a distance from an object-side surface of the first lens to an image plane of an imaging element is long, there is a limit to achieve satisfactory correction of aberrations while further downsizing the imaging lens to satisfy the above-described demands.

Alternatively, there is another method to reduce the level of downsizing required for the imaging lens by providing a camera as a separate unit from cellular phones or smartphones. However, in terms of convenience or portability, cellular phones or smartphones with built-in cameras are still dominantly preferred. Therefore, there remains a demand for small imaging lenses with high resolution.

Such a problem is not specific to the imaging lens to be mounted in cellular phones and smartphones. Rather, it is a common problem even for an imaging lens to be mounted in a relatively small camera such as digital still cameras, portable information terminals, security cameras, vehicle onboard cameras, and network cameras.

In view of the above-described problems in conventional techniques, an object of the present invention is to provide an imaging lens that can attain both downsizing thereof and satisfactory aberration correction.

Further objects and advantages of the present invention will be apparent from the following description of the invention.

SUMMARY OF THE INVENTION

According to a first aspect of the present invention, in order to attain the objects described above, there is provided an imaging lens that forms an image of an object on an imaging element. The imaging lens of the invention includes a first lens having positive refractive power; a second lens having positive refractive power; a third lens; a fourth lens; a fifth lens; and a sixth lens having negative refractive power, arranged in the order from an object side to an image plane side. According to the first aspect of the invention, the sixth lens is formed in a shape so as to have negative curvature radii both on the object-side surface thereof and image plane-side surface thereof. When the whole lens system has the focal length f and a curvature radius of the image plane-side surface of the sixth lens is R6r, the imaging lens of the invention satisfies the following conditional expression (1):

$$-10 < R6r/f < -1 \qquad (1)$$

According to the imaging lens of the invention, it is achievable to suitably downsize the imaging lens with the first and the second lenses, which have positive refractive powers. In addition, when the imaging lens satisfies the conditional expression (1), it is also achievable to satisfactorily correct aberrations. When the imaging lens satisfies the conditional expression (1), it is achievable to satisfactorily correct astigmatism and a distortion. In addition, when the imaging lens satisfies the conditional expression (1), it is also achievable to restrain an incident angle of a light beam emitted from the imaging lens to an imaging element within the range of a chief ray angle (CRA). As is well known, a so-called chief ray angle (CRA) is set in advance for an imaging element, i.e. a range of an incident angle of a light beam that can be taken in the image plane. When a light beam outside the range of CRA enters the imaging element, "shading" occurs, which is an obstacle for achieving satisfactory image-forming performance.

When the value exceeds the upper limit of −1 in the conditional expression (1), at periphery of the image, the astigmatic difference increases and the distortion increases in a positive direction (image plane side). Therefore, it is difficult to obtain satisfactory image-forming performance. Moreover, the incident angle of a light beam emitted from the imaging lens to the image plane is large, so that it is difficult to restrain the incident angle within the range of CRA. On the other hand, when the value is below the lower limit of −10, it is advantageous for correction of the astigmatism. However, since the distortion increases in a negative direction (object side) at periphery of the image, it is difficult to obtain satisfactory image-forming performance. Moreover, the incident angle of a light beam emitted from the imaging lens is small, so that it is difficult to restrain the incident angle within the range of CRA.

According to a second aspect of the invention, when a curvature radius of the object-side surface of the fourth lens is R4f and a curvature radius of the image plane-side surface of the fourth lens is R4r, the imaging lens having the above-described configuration preferably satisfies the following conditional expression (2):

$$0.5 < |R4f/R4r| < 2.0 \tag{2}$$

When the imaging lens satisfies the conditional expression (2), it is achievable to restrain the field curvature, the chromatic aberration of magnification, and the astigmatism within satisfactory ranges in a balanced manner. When the value exceeds the upper limit of 2.0, the image-forming surface curves to the object side, and the field curvature is insufficiently corrected. In addition, the chromatic aberration of magnification is excessively corrected (an image-forming point at a short wavelength moves in a direction to be away from the optical axis relative to that at a reference wavelength). Therefore, it is difficult to obtain satisfactory image-forming performance. On the other hand, when the value is below the lower limit of 0.5, it is advantageous for correction of the chromatic aberration of magnification. However, the image-forming surface tilts to the image plane side, the field curvature is excessively corrected, and the astigmatic difference increases. Therefore, it is difficult to obtain satisfactory image-forming performance.

According to a third aspect of the invention, when the second lens has a focal length f2 and the third lens has a focal length f3, the imaging lens having the above-described configuration preferably satisfies the following conditional expression (3):

$$0.2 < |f3/f2| < 1.2 \tag{3}$$

When the imaging lens satisfies the conditional expression (3), it is achievable to satisfactorily correct the chromatic aberration and the astigmatism. When the value exceeds the upper limit of 1.2, it is advantageous for correction of the chromatic aberration of magnification for an off-axis light flux. However, the axial chromatic aberration is insufficiently corrected (a focal position at a short wavelength moves to the object side relative to that at a reference wavelength). Moreover, in the astigmatism, a sagittal image surface curves to the object side and the astigmatic difference increases. Therefore, it is difficult to obtain satisfactory image-forming performance. On the other hand, when the value is below the lower limit of 0.2, it is advantageous for correction of the axial chromatic aberration. However, the chromatic aberration of magnification for the off-axis light flux is excessively corrected. Moreover, the astigmatism increases, so that it is difficult to obtain satisfactory image-forming performance.

According to a fourth aspect of the invention, when the whole lens system has a focal length f and the third lens has a focal length f3, the imaging lens having the above-described configuration preferably satisfies the following conditional expression (4):

$$-2.0 < f3/f < -0.5 \tag{4}$$

When the imaging lens satisfies the conditional expression (4), it is achievable to satisfactorily correct the chromatic aberration and the spherical aberration. When the value exceeds the upper limit of −0.5, it is advantageous for correction of the axial chromatic aberration. However, the chromatic aberration of magnification for the off-axis light flux is excessively corrected, and the spherical aberration increases in the positive direction and is excessively corrected. For this reason, it is difficult to obtain satisfactory image-forming performance. On the other hand, when the value is below the lower limit of −2.0, it is advantageous for correction of the chromatic aberration of magnification for the off-axis light flux. However, the axial chromatic aberration is insufficiently corrected. In addition, the spherical aberration increases in the negative direction and is insufficiently corrected. Therefore, it is difficult to obtain satisfactory image-forming performance.

According to a fifth aspect of the invention, when the third lens has a focal length f3 and the sixth lens has a focal length f6, the imaging lens having the above-described configuration preferably satisfies the following conditional expression (5):

$$0.5 < f3/f6 < 1.5 \tag{5}$$

When the imaging lens satisfies the conditional expression (5), it is possible to restrain the chromatic aberration, the distortion, and the spherical aberration respectively within satisfactory ranges in a balanced manner. When the value exceeds the upper limit of 1.5, it is advantageous for correction of the distortion and the chromatic aberration of magnification. However, the axial chromatic aberration is insufficiently corrected, and the spherical aberration is insufficiently corrected. Therefore, it is difficult to obtain satisfactory image-forming performance. On the other hand, when the value is below the lower limit of 0.5, it is advantageous for correction of the axial chromatic aberration. However, the distortion increases in the positive direction and the spherical aberration is excessively corrected. In addition, the chromatic aberration of magnification for the off-axis light flux is excessively corrected. Therefore, it is difficult to obtain satisfactory image-forming performance.

According to a sixth aspect of the invention, when the whole lens system has the focal length f and the sixth lens has a focal length f6, the imaging lens having the above-described configuration preferably satisfies the following conditional expression (6):

$$-2.0<f6/f<-0.5 \qquad (6)$$

When the imaging lens satisfies the conditional expression (6), it is achievable to satisfactorily correct the chromatic aberration of magnification, the astigmatism, and the distortion, while downsizing the imaging lens. When the value exceeds the upper limit of −0.5, it is advantageous for downsizing of the imaging lens. However, the chromatic aberration of magnification is excessively corrected. Therefore, it is difficult to obtain satisfactory image-forming performance. Moreover, the incident angle of a light beam emitted from the imaging lens is large, and it is difficult to restrain the incident angle within the range of CRA. On the other hand, when the value is below the lower limit of −2.0, it is advantageous for correction of chromatic aberration of magnification for the off-axis light flux. However, it is difficult to downsize the imaging lens. Moreover, in the astigmatism, the tangential image surface curves to the image plane side and the astigmatic difference increases. Therefore, it is difficult to obtain satisfactory image-forming performance.

According to a seventh aspect of the invention, when the whole lens system has the focal length f and a distance along the optical axis between the third lens and the fourth lens is D34, the imaging lens having the above-described configuration preferably satisfies the following conditional expression (7):

$$0.05<D34/f<0.2 \qquad (7)$$

When the imaging lens satisfies the conditional expression (7), it is achievable to restrain the distortion, the astigmatism, the field curvature, and the chromatic aberration of magnification respectively within satisfactory ranges in a balanced manner. When the value exceeds the upper limit of 0.2, the distortion increases in the positive direction, and the field curvature is excessively corrected. Moreover, the astigmatic difference increases, and the chromatic aberration of magnification for the off-axis light flux is excessively corrected. For this reason, it is difficult to obtain satisfactory image-forming performance. When the value is below the lower limit of 0.05, the distortion increases in the negative direction, and the field curvature is insufficiently corrected. Moreover, the astigmatic difference increases and the spherical aberration is excessively corrected. Therefore, it is difficult to obtain satisfactory image-forming performance.

According to an eighth aspect of the invention, when the whole lens system has the focal length f and a distance along the optical axis between the fourth lens and the fifth lens is D45, the imaging lens having the above-described configuration preferably satisfies the following conditional expression (8):

$$0.02<D45/f<0.2 \qquad (8)$$

When the imaging lens satisfies the conditional expression (8), it is achievable to satisfactorily correct the distortion, the astigmatism, the spherical aberration, and the chromatic aberration of magnification. When the value exceeds the upper limit of 0.2, both the spherical aberration and the field curvature are insufficiently corrected, and the astigmatic difference increases. Moreover, the distortion increases in a negative direction and the chromatic aberration of magnification for the off-axis light flux is excessively corrected. Therefore, it is difficult to obtain satisfactory image-forming performance. On the other hand, when the value is below the lower limit of 0.02, it is advantageous for correction of the distortion. However, both the spherical aberration and the field curvature are excessively corrected, and the astigmatic difference increases. Therefore, it is difficult to obtain satisfactory image-forming performance.

According to a ninth aspect of the invention, when the whole lens system has the focal length f and a distance along the optical axis between the fifth lens and the sixth lens is D56, the imaging lens having the above-described configuration preferably satisfies the following conditional expression (9):

$$0.05<D56/f<0.2 \qquad (9)$$

When the imaging lens satisfies the conditional expression (9), it is achievable to restrain the distortion, the astigmatism, and the chromatic aberration of magnification respectively within satisfactory ranges in a balanced manner, while restraining the incident angle of a light beam emitted from the imaging lens within the range of CRA. When the value exceeds the upper limit of 0.2, it is easy to restrain the incident angle within the range of CRA. However, in the astigmatism, the sagittal image surface tilts to the image plane side, so that an astigmatic difference increases. Therefore, it is difficult to obtain satisfactory image-forming performance. On the other hand, when the value is below the lower limit of 0.05, the distortion increases in the positive direction, and the chromatic aberration of magnification for the off-axis light flux is excessively corrected. Moreover, in the astigmatism, the sagittal image surface tilts to the object side and the astigmatic difference increases. Therefore, it is difficult to obtain satisfactory image-forming performance.

According to a tenth aspect of the invention, when the fifth lens has a thickness T5 along the optical axis and the sixth lens has a thickness T6 along the optical axis, the imaging lens having the above-described configuration preferably satisfies the following conditional expression (10):

$$0.5<T5/T6<3.0 \qquad (10)$$

When the imaging lens satisfies the conditional expression (10), it is achievable to satisfactorily correct the field curvature and the astigmatism. When the value exceeds the upper limit of 3.0, the field curvature is excessively corrected. In addition, in the astigmatism, the sagittal image surface tilts to the image plane side, and the astigmatic difference increases. For this reason, it is difficult to obtain satisfactory image-forming performance. On the other hand, when the value is below the lower limit of 0.5, the field curvature is insufficiently corrected and the astigmatism increases. Therefore, it is difficult to obtain satisfactory image-forming performance.

According to a eleventh aspect of the invention, when the whole lens system has a focal length f, a composite focal length of the fifth lens and the sixth lens is f56, the imaging lens having the above-described configuration preferably satisfies the following conditional expression (11):

$$-10<f56/f<-0.5 \qquad (11)$$

When the imaging lens satisfies the conditional expression (11), it is achievable to restrain the chromatic aberration, the astigmatism, and the distortion respectively within satisfactory ranges in a balanced manner. When the value exceeds the upper limit of −0.5, it is advantageous for correction of the chromatic aberration of magnification. However, the axial chromatic aberration is insufficiently corrected. Moreover, in the astigmatism, the tangential image surface tilts to the object side and the astigmatic difference increases. Therefore, it is difficult to obtain satisfactory image-forming performance. On the other hand, when the value is below the lower limit of −10, it is advantageous for correction of the axial chromatic aberration. However, in the astigmatism, the tangential image surface tilts to the image plane side and the astigmatic difference increases. Further, the spherical aberration is excessively corrected, and it is difficult to obtain satisfactory image-forming performance.

According to a twelfth aspect of the invention, when the first lens has Abbe's number vd1, the second lens has Abbe's number vd2, and the third lens has Abbe's number vd3, in order to satisfactorily correct the chromatic aberration, the imaging lens preferably satisfies the following conditional expressions (12) through (14):

$$35 < vd1 < 75 \quad (12)$$

$$35 < vd2 < 75 \quad (13)$$

$$15 < vd3 < 35 \quad (14)$$

According to a thirteenth aspect of the invention, when the fourth lens has Abbe's number vd4, the fifth lens has Abbe's number vd5, and the sixth lens has Abbe's number vd6, in order to more satisfactorily correct the chromatic aberration, the imaging lens preferably satisfies the following conditional expressions (15) through (17):

$$15 < vd4 < 35 \quad (15)$$

$$35 < vd5 < 75 \quad (16)$$

$$35 < vd6 < 75 \quad (17)$$

In the imaging lens having the above-described configuration, the sixth lens preferably has the image plane-side surface formed in an aspheric surface, so that a curvature thereof increases monotonously away from an optical axis thereof toward a periphery thereof in a direction perpendicular to the optical axis.

As described above, in case of an imaging element, CRA is set in advance. Therefore, in order to obtain satisfactory image-forming performance, it is necessary to restrain the incident angle of a light beam emitted from the imaging lens to the image plane within the range of CRA. In order to attain further downsizing of the imaging lens, the emitting angle of a light beam emitted from the image plane-side surface of the sixth lens is large near periphery of the lens. Therefore, it is difficult to restrain the incident angle to the image plane within the range of CRA over the whole image.

On this point, in case of the sixth lens of the invention, the image plane-side surface thereof is formed as an aspheric shape, in which a curvature thereof increases as it goes to the periphery of the lens, i.e., formed in a shape such that a curvature thereof is large near the lens periphery. Therefore, it is achievable to keep the emitting angle of a light beam from the lens periphery small, and it is achievable to suitably restrain the incident angle to the image plane within the range of CRA over the whole image.

Here, according to the invention, as described above, the shape of the lens is specified by the positive/negative sign of the curvature radius. Whether the curvature radius of the lens is positive or negative is determined based on general definition. More specifically, taking a traveling direction of light as positive, if a center of a curvature radius is on the image plane side when viewed from a lens surface, the curvature radius is positive. If a center of a curvature radius is on the object side, the curvature radius is negative.

Therefore, "an object side surface, a curvature radius of which is positive" means the object side surface is a convex surface. "An object side surface, a curvature radius of which is negative" means the object side surface is a concave surface. "An image plane side surface, a curvature radius of which is positive" means the image plane side surface is a concave surface. "An image plane side surface, a curvature radius of which is negative" means the image plane side surface is a convex surface. Here, a curvature radius used herein refers to a paraxial curvature radius, and may not fit to general shapes of the lenses in their sectional views all the time.

According to the imaging lens of the present invention, it is possible to provide a small-sized imaging lens that is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13, 16, and 19 are schematic sectional views of the imaging lenses in Numerical Data Examples 1 to 7 according to the embodiment, respectively. Since the imaging lenses in those Numerical Data Examples have the same basic configuration, the lens configuration of the embodiment will be described with reference to the illustrative sectional view of Numerical Data Example 1.

Figure 1:
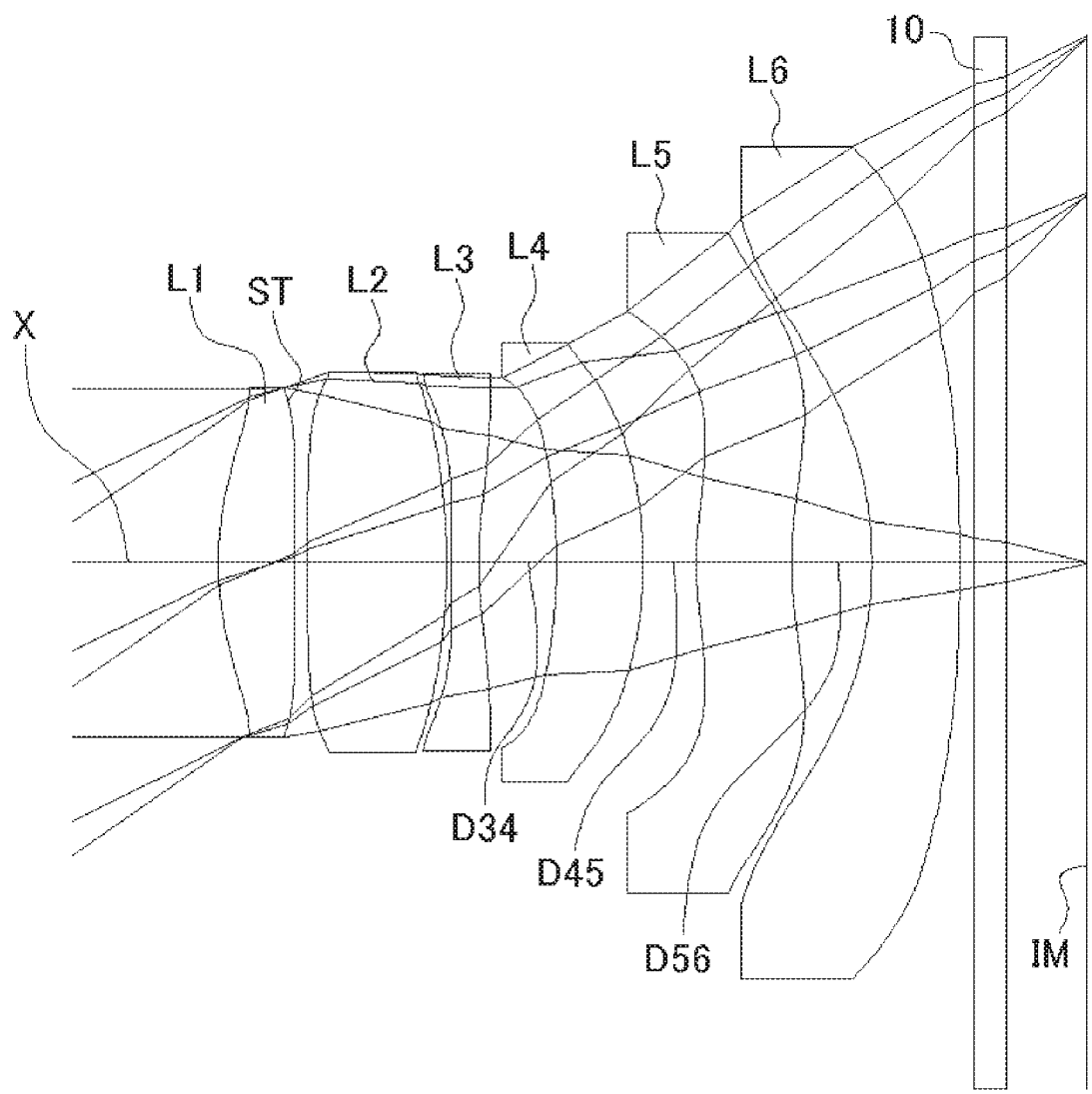
FIG. 1 shows a sectional view of a schematic configuration of an imaging lens in Numerical Data Example 1 of the present invention.

As shown in FIG. 1, according to the embodiment, the imaging lens includes a first lens L1 having positive refractive power, a second lens L2 having positive refractive power, a third lens L3, a fourth lens L4, a fifth lens L5, and a sixth lens L6 having negative refractive power, arranged in the order from an object side to an image plane side. Between the sixth lens L6 and an image plane IM of an imaging element, there is provided a filter 10. The filter 10 is omissible.

The first lens L1 is formed in a shape such that a curvature radius r1 of an object-side surface thereof and a curvature radius r2 of an image plane-side surface thereof are both positive, so as to have a shape of a meniscus lens directing a convex surface thereof on an object side near an optical axis X. The shape of the first lens L1 is not limited to the one in Numerical Data Example 1, and can be varied. Numerical Data Examples 3 and 6 are examples, in which the first lens L1 is formed in a shape, such that a curvature radius r2 of an image plane-side surface thereof is negative, i.e., so as to have a shape of a biconvex lens near an optical axis X. In addition to the above-described shape, the first lens L1 also can be formed in a shape, such that the curvature radius r1 is infinite and the curvature radius r2 is negative, so as to have a shape of a plano-convex lens directing a flat surface to the object side near the optical axis X.

Alternatively, the first lens L1 also can be formed in a shape, such that both the curvature radius r1 and the curvature radius r2 are negative, so as to have a shape of a meniscus lens directing a concave surface to the object side near the optical axis X.

In the imaging lens of the embodiment, there is provided an aperture stop ST between the first lens L1 and the second lens L2. When the aperture stop ST is provided in such position, the presence of the imaging lens in a camera is emphasized. Therefore, it is possible to appeal to users by the luxurious impression, high lens performance, etc. as a part of design of the camera. Here, the position of the aperture stop ST may not be limited to the one described in Numerical Data Example 1. For example, in order to easily assemble the imaging lens, the aperture stop ST may be provided on the object side of the first lens L1.

The second lens L2 is formed in a shape such that a curvature radius r3 of an object-side surface thereof is positive and a curvature radius r4 of an image plane-side surface thereof is negative, so as to have a shape of a biconvex lens near the optical axis X. The shape of the second lens L2 may not be limited to the one in Numerical Data Example 1. The imaging lens of Numerical Data Examples 2, 3, 4, 6, and 7 are examples, in which the second lens L2 is formed in a shape such that a curvature radius r3 and a curvature radius r4 are both negative, so as to have a shape of a meniscus lens directing a concave surface thereof to the object side near the optical axis X. On the other hand, the imaging lens of Numerical Data Example 5 is an example, in which the second lens L2 is formed in a shape such that the curvature radius r3 and the curvature radius r4 are both positive, so as to have a shape of a meniscus lens directing a convex surface thereof to the object side near the optical axis X.

The third lens L3 has negative refractive power. In addition, the third lens L3 is formed in a shape such that a curvature radius r5 of an object-side surface thereof and a curvature radius r6 of an image plane-side surface thereof are both positive, so as to have a shape of a meniscus lens directing a convex surface thereof to the object side near the optical axis X. The shape of the third lens L3 is not limited to the one in Numerical Data Example 1. However, the third lens L3 is preferably formed such that the curvature radius r6 of the image plane side-side surface thereof is positive. The imaging lens of Numerical Data Example 3 is an example, in which the third lens L3 is formed in a shape such that the curvature radius r5 is negative and the curvature radius r6 is positive, so as to have a shape of a biconcave lens near the optical axis X.

The fourth lens L4 has positive refractive power. In addition, the fourth lens L4 is formed in a shape such that a curvature radius r7 of an object-side surface thereof and a curvature radius r8 of an image plane-side surface thereof are both negative, so as to have a shape of a meniscus lens directing a concave surface thereof to the object side near the optical axis X. The refractive power of the fourth lens L4 is not limited to positive ones. Numerical Data Examples 4 and 5 are examples, in which the refractive power of the fourth lens L4 is negative. Moreover, the shape of the fourth lens L4 is also not limited to the one in Numerical Data Example 1. The imaging lens of Numerical Data Example 2 is an example, in which the fourth lens L4 is formed in a shape such that the curvature radius r7 is positive and the curvature radius r8 is negative, so as to have a shape of a biconvex lens near the optical axis X.

On the other hand, the imaging lens of Numerical Data Example 4 is an example, in which the fourth lens L4 is formed in a shape such that the curvature radius r7 and the curvature radius r8 are both positive, so as to have a shape of a meniscus lens directing a convex surface thereof to the object side near the optical axis X. The fourth lens L4 can be also formed in a shape such that the curvature radius r7 and the curvature radius r8 are both infinite and has refractive power near the lens periphery.

The fifth lens L5 has positive refractive power. In addition, the fifth lens L5 is formed in a shape such that a curvature radius r9 of an object-side surface thereof and a curvature radius r1 0 of an image plane-side surface thereof are both positive, so as to have a shape of a meniscus lens directing a convex surface thereof to the object side near the optical axis X. The refractive power of the fifth lens L5 is not limited to positive ones. Numerical Data Examples 6 and 7 are examples, in which the refractive power of the fifth lens L5 is negative.

The shape of the fifth lens L5 is not limited to the one in Numerical Data Example 1. The fifth lens L5 can be formed in any shape, as long as it is a shape of a meniscus lens. The imaging lens of Numerical Data Example 7 is an example, in which the fifth lens L5 is formed in a shape such that the curvature radius r9 and the curvature radius r10 are both negative, so as to have a shape of a meniscus lens directing a concave surface thereof to the object side near the optical axis X. The fifth lens L5 can be also formed in a shape such that the curvature radius r9 and the curvature radius r10 are both infinite and has refractive power near the lens periphery.

The sixth lens L6 is formed in a shape such that a curvature radius r11 of an object-side surface thereof and a curvature radius r12 of an image plane-side surface thereof are both negative, so as to have a shape of a meniscus lens directing a concave surface thereof to the object side near the optical axis X. In the sixth lens L6, the image plane-side surface thereof is formed as an aspheric shape not having an inflexion point. More specifically, the image plane-side surface of the sixth lens L6 is formed as an aspheric shape, such that the curvature monotonously increases as the distance from the optical axis in a direction perpendicular to the optical axis X is longer.

The image plane-side surface of the fifth lens L5 and the object-side surface of the sixth lens L6 are formed as aspheric shapes having inflexion points. With those shapes of the fifth lens L5 and the sixth lens L6, it is achievable to satisfactorily correct the off-axis chromatic aberration of magnification as well as the axial chromatic aberration. In addition, it is also achievable to suitably restrain an incident angle of a light beam emitted from the imaging lens to the image plane IM within the range of CRA.

According to the embodiment, the imaging lens satisfies the following conditional expressions (1) to (11):

$$-10 < R6r/f < -1 \tag{1}$$

$$0.5 < |R4f/R4r| < 2.0 \tag{2}$$

$$0.2 < |f3/f2| < 1.2 \tag{3}$$

$$-2.0 < f3/f < -0.5 \tag{4}$$

$$0.5 < f3/f6 < 1.5 \tag{5}$$

$$-2.0 < f6/f < -0.5 \tag{6}$$

$$0.05 < D34/f < 0.2 \tag{7}$$

$$0.02 < D45/f < 0.2 \tag{8}$$

$$0.05 < D56/f < 0.2 \tag{9}$$

$$0.5 < T5/T6 < 3.0 \tag{10}$$

$$-10 < f56/f < -0.5 \tag{11}$$

In the above conditional expressions:
f: Focal length of a whole lens system
f2: Focal length of the second lens L2
f3: Focal length of the third lens L3
f6: Focal length of the sixth lens L6
f56: Composite focal length of the fifth lens L5 and the sixth lens L6
R4f: Curvature radius of an object-side surface of a fourth lens L4 (=r7)
R4r: Curvature radius of an image plane-side surface of the fourth lens L4 (=r8)
R6r: Curvature radius of an image plane-side surface of the sixth lens L6 (=r12)
D34: Distance along the optical axis X between the third lens L3 and the fourth lens L4
D45: Distance along the optical axis X between the fourth lens L4 and the fifth lens L5
D56: Distance along the optical axis X between the fifth lens L5 and the sixth lens L6
T5: Thickness of the fifth lens L5 on the optical axis
T6: Thickness of the sixth lens L6 along the optical axis In addition, the imaging lens according to the embodiment further satisfies the following conditional expressions (12) through (17):

$$35 < vd1 < 75 \tag{12}$$

$$35 < vd2 < 75 \tag{13}$$

$$15 < vd3 < 35 \tag{14}$$

$$15 < vd4 < 35 \tag{15}$$

$$35 < vd5 < 75 \tag{16}$$

$$35 < vd6 < 75 \tag{17}$$

In the above conditional expressions:
vd1: Abbe's number of the first lens L1
vd2: Abbe's number of the second lens L2
vd3: Abbe's number of the third lens L3
vd4: Abbe's number of the fourth lens L4
vd5: Abbe's number of the fifth lens L5
vd6: Abbe's number of the sixth lens L6

Here, it is not necessary to satisfy all of the conditional expressions, and it is achievable to obtain an effect corresponding to the respective conditional expression when any single one of the conditional expressions is individually satisfied.

In the embodiment, all lens surfaces are formed as an aspheric surface. The aspheric shapes of the lens surfaces are expressed by the following formula:

$$Z = \frac{C \cdot H^2}{1 + \sqrt{1 - (1+k) \cdot C^2 \cdot H^2}} + \sum (An \cdot H^n)$$

In the above conditional expressions:
Z: Distance in a direction of the optical axis
H: Distance from the optical axis in a direction perpendicular to the optical axis
C: Paraxial curvature (=1/r, r: paraxial curvature radius)
k: Conic constant
An: The nth order aspheric coefficient Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index, and vd represents an Abbe's number, respectively. Here, aspheric surfaces are indicated with surface numbers i affixed with * (asterisk).

NUMERICAL DATA EXAMPLE 1

Basic Lens Data

TABLE 1

| | | f = 5.00 mm Fno = 1.97 ω = 35.0° | | | | |
|---|---|---|---|---|---|---|
| | i | r | d | nd | vd | [mm] |
| | | ∞ | ∞ | | | |
| L1 | 1* | 2.172 | 0.507 | 1.5348 | 55.7 | f1 = 4.439 |
| | 2* (ST) | 23.418 | 0.088 | | | |
| L2 | 3* | 62.059 | 0.930 | 1.5348 | 55.7 | f2 = 7.188 |
| | 4* | −4.077 | 0.030 | | | |
| L3 | 5* | 13.009 | 0.185 | 1.6503 | 21.5 | f3 = −5.353 |
| | 6* | 2.731 | 0.519 | (=D34) | | |
| L4 | 7* | −3.824 | 0.578 | 1.6142 | 25.6 | f4 = 31.940 |
| | 8* | −3.384 | 0.356 | (=D45) | | |
| L5 | 9* | 2.440 | 0.636 | 1.5348 | 55.7 | f5 = 33.868 |
| | 10* | 2.564 | 0.537 | (=D56) | | |
| L6 | 11* | −2.831 | 0.585 | 1.5348 | 55.7 | f6 = −6.187 |
| | 12* | −21.039 | 0.100 | | | |
| | 13 | ∞ | 0.210 | 1.5168 | 64.2 | |
| | 14 | ∞ | 0.543 | | | |
| (IM) | | ∞ | | | | | f56 = −8.684 mm
T5 = 0.636 mm
T6 = 0.585 mm

TABLE 2

| | | | | Aspherical surface data | | | | |
|---|---|---|---|---|---|---|---|---|
| i | k | A4 | A6 | A8 | A10 | A12 | A14 | A16 |
| 1 | 0 | −2.865E−02 | 5.884E−03 | −7.544E−02 | 1.114E−01 | −1.201E−01 | 6.396E−02 | −1.280E−02 |
| 2 | 0 | −2.211E−02 | −2.310E−02 | −8.985E−03 | 2.161E−02 | −2.415E−02 | 1.504E−02 | −3.777E−03 |
| 3 | 0 | 2.807E−02 | −5.775E−03 | 1.103E−02 | −1.337E−03 | 1.671E−02 | −1.450E−02 | 3.161E−03 |
| 4 | 0 | 3.791E−02 | −7.263E−02 | 8.920E−02 | −9.100E−02 | 5.844E−02 | −1.912E−02 | 2.272E−03 |
| 5 | 0 | −1.796E−01 | 5.171E−02 | −3.727E−02 | 4.113E−02 | −1.528E−02 | 3.716E−03 | −8.146E−04 |
| 6 | 0 | −1.747E−01 | 9.424E−02 | −5.710E−02 | 2.347E−02 | 3.570E−03 | −6.929E−03 | 2.056E−03 |
| 7 | 0 | 3.260E−02 | −1.024E−02 | 9.834E−02 | −1.217E−01 | 6.509E−02 | −1.853E−02 | 1.120E−03 |
| 8 | 0 | −8.894E−02 | 8.145E−02 | −4.299E−02 | 2.172E−03 | 8.205E−03 | −5.473E−03 | 1.319E−03 |
| 9 | 0 | −2.250E−01 | 9.241E−02 | −4.747E−02 | 1.902E−02 | −5.979E−03 | 8.511E−04 | −1.171E−06 |
| 10 | 0 | −1.417E−01 | 3.036E−02 | −6.219E−03 | 3.649E−04 | 1.686E−04 | −2.906E−05 | 9.905E−07 |
| 11 | 0 | −2.327E−02 | 5.474E−03 | 6.025E−04 | 4.197E−06 | −2.712E−05 | 2.340E−06 | −2.280E−08 |
| 12 | 0 | −2.773E−02 | 9.926E−03 | −1.636E−03 | 6.048E−05 | 9.800E−06 | −1.086E−06 | 3.279E−08 |

The values of the respective conditional expressions are as follows:
R6r/f=−4.21
|R4f/R4r|=1.13
|f3/f2|=0.74
f3/f=−1.07
f3/f6=0.87
f6/f=−1.24
D34/f=0.10
D45/f=0.07
D56/f=0.11
T5/T6=1.09
f56/f=−1.74

Accordingly, the imaging lens of Numerical Data Example 1 satisfies the above-described conditional expressions. The distance on the optical axis X from the object-side surface of the first lens L1 to the image plane IM (air conversion length for the filter 10) is 5.732 mm, and downsizing of the imaging lens is attained.

Figure 2:
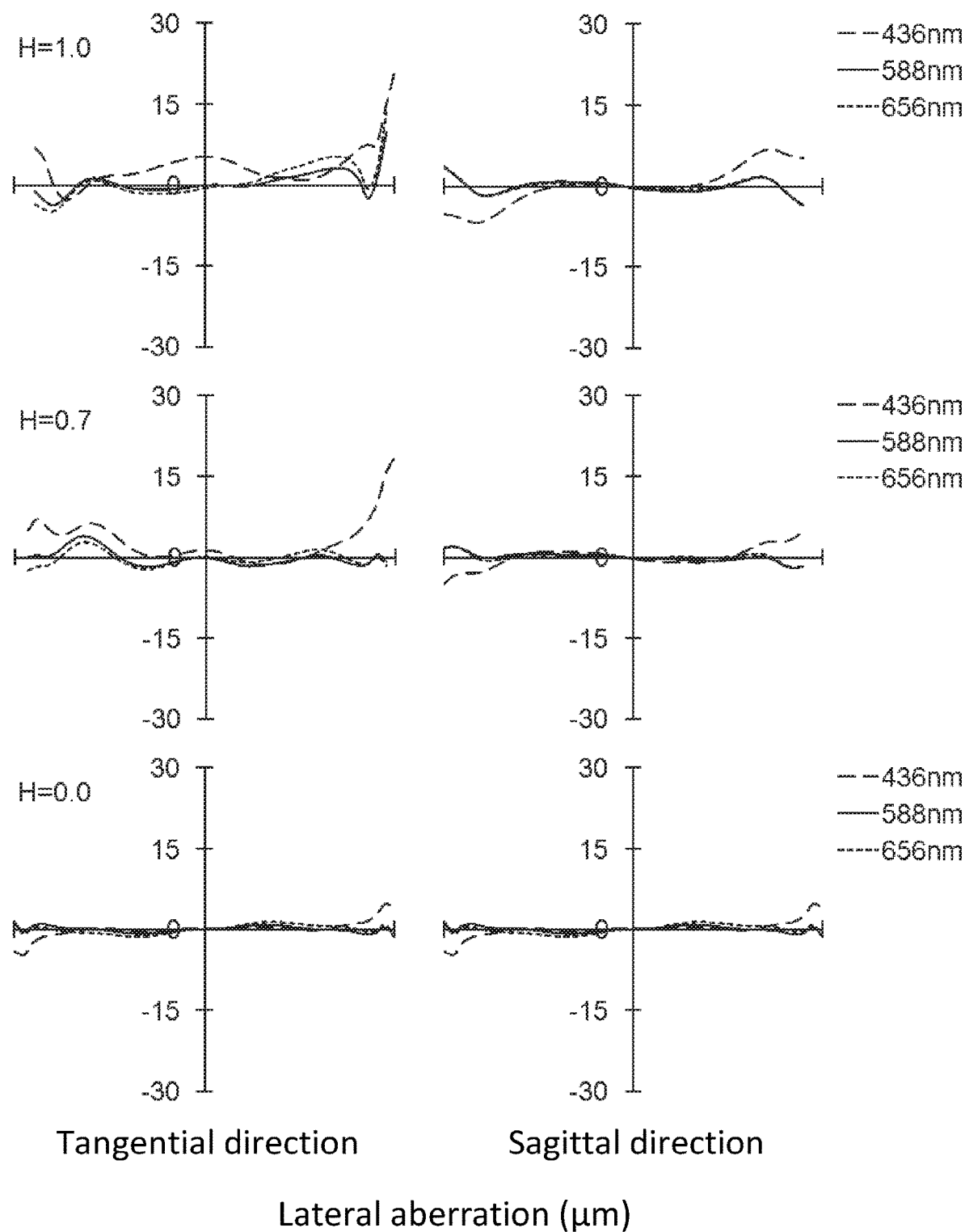
FIG. 2 is an aberration diagram showing a lateral aberration of the imaging lens of FIG. 1.

FIG. 2 shows a lateral aberration that corresponds to a ratio H of each image height to the maximum image height (hereinafter referred to as "image height ratio H"), which is divided into a tangential direction and a sagittal direction (The same is true for FIGS. 5, 8, 11, 14, 17, and 20).

Figure 3:
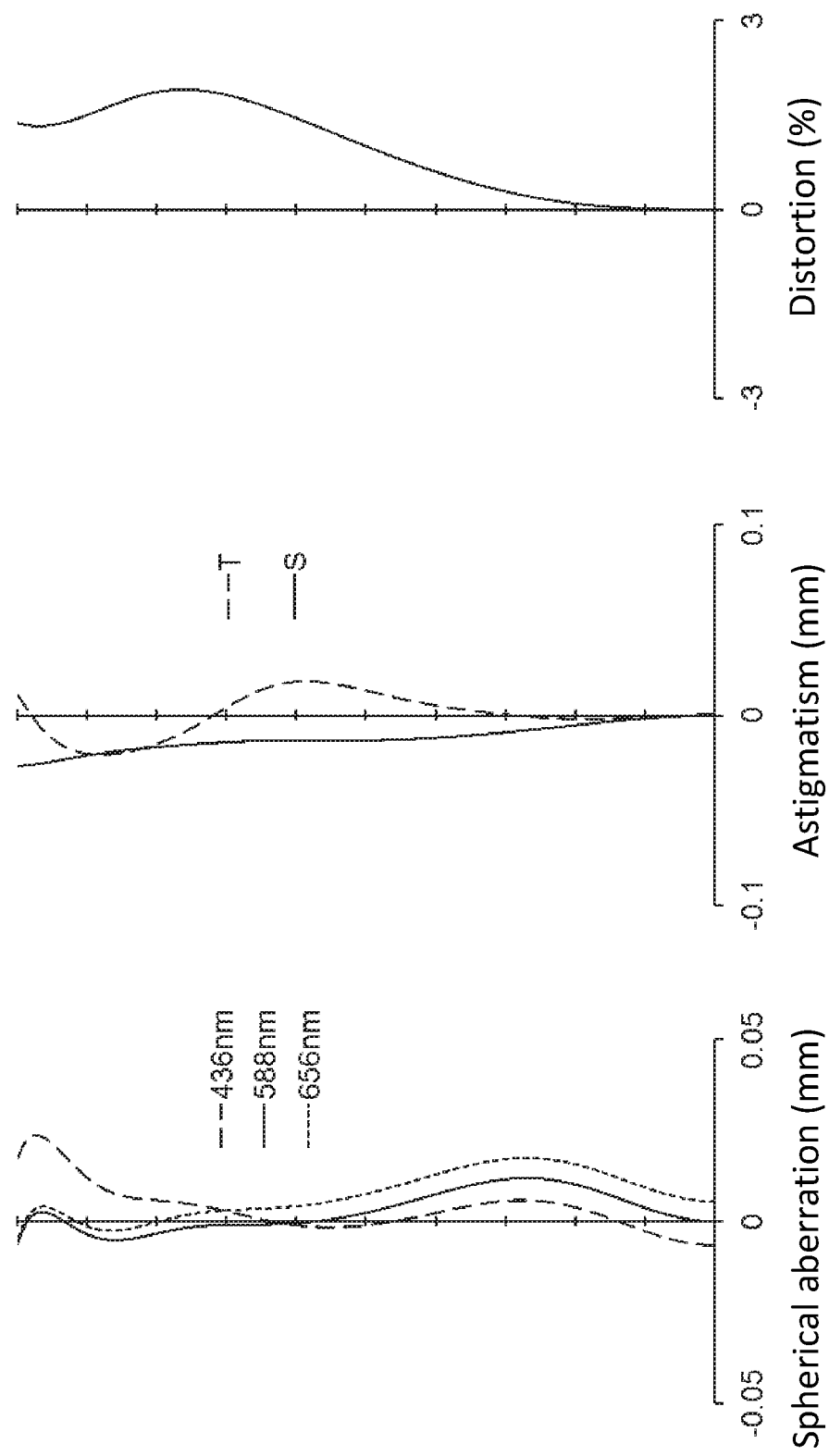
FIG. 3 is an aberration diagram showing a spherical aberration, astigmatism, and a distortion of the imaging lens of FIG. 1.
Figure 4:
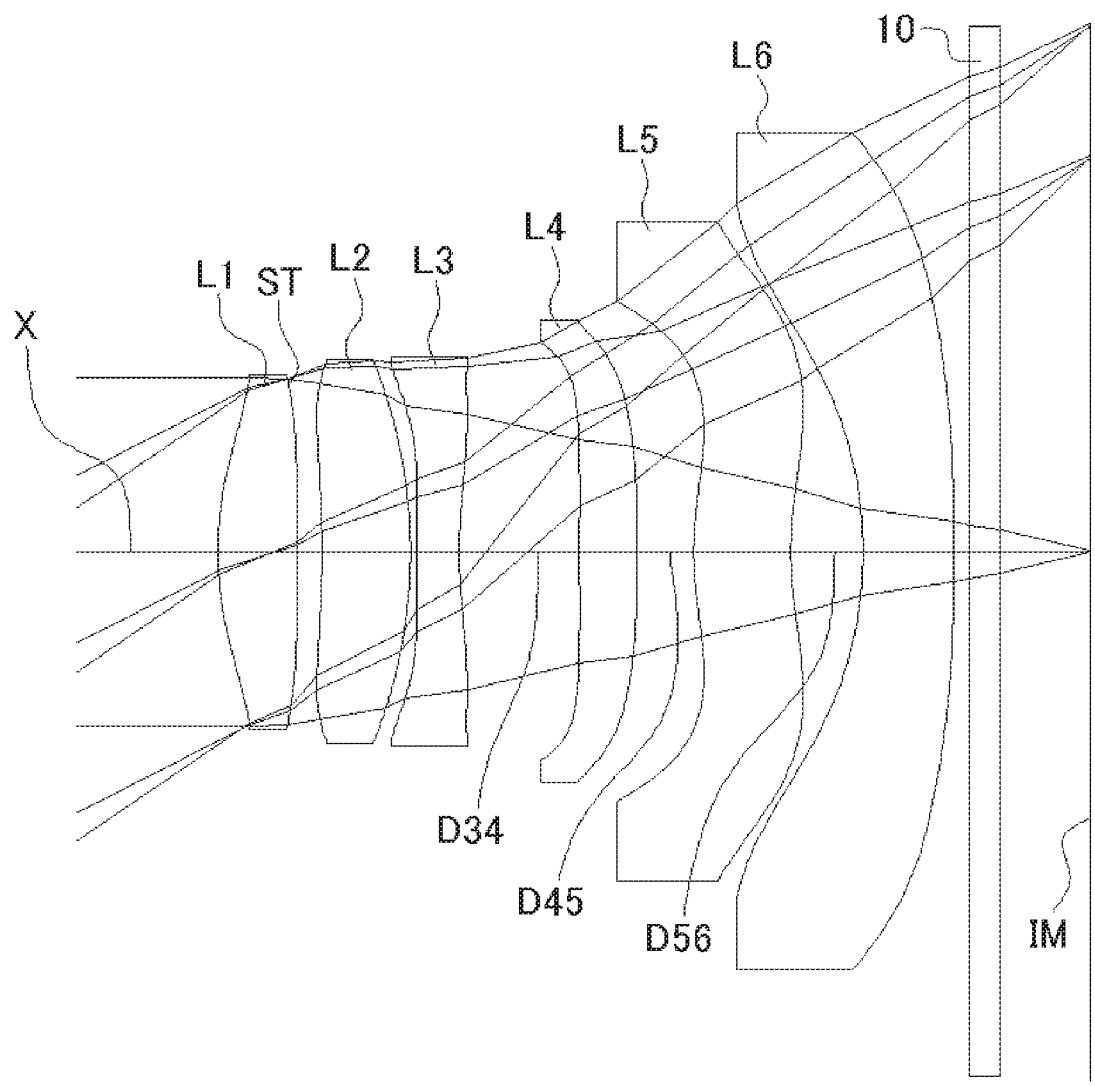
FIG. 4 shows a sectional view of a schematic configuration of an imaging lens in Numerical Data Example 2 of the present invention.

Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, 15, 18, and 21). As shown in FIGS. 2 and 3, according to the imaging lens of Numerical Data Example 1, the aberrations are satisfactorily corrected.

NUMERICAL DATA EXAMPLE 2

Basic Lens Data

TABLE 3

| | | f = 5.07 mm Fno = 2.18 ω = 34.6° | | | | |
|---|---|---|---|---|---|---|
| | i | r | d | nd | vd | [mm] |
| | | ∞ | ∞ | | | |
| L1 | 1* | 2.294 | 0.523 | 1.5348 | 55.7 | f1 = 4.433 |
| | 2* (ST) | 65.389 | 0.168 | | | |
| L2 | 3* | −7.269 | 0.589 | 1.5348 | 55.7 | f2 = 9.980 |
| | 4* | −3.165 | 0.043 | | | |

TABLE 3-continued

| | | f = 5.07 mm Fno = 2.18 ω = 34.6° | | | | |
|---|---|---|---|---|---|---|
| | i | r | d | nd | vd | [mm] |
| L3 | 5* | 12.655 | 0.282 | 1.6503 | 21.5 | f3 = −6.382 |
| | 6* | 3.098 | 0.799 | (=D34) | | |
| L4 | 7* | 89.212 | 0.381 | 1.6142 | 25.6 | f4 = 70.954 |
| | 8* | −85.067 | 0.377 | (=D45) | | |
| L5 | 9* | 2.152 | 0.647 | 1.5348 | 55.7 | f5 = 17.156 |
| | 10* | 2.518 | 0.480 | (=D56) | | |
| L6 | 11* | −2.909 | 0.605 | 1.5348 | 55.7 | f6 = −6.435 |
| | 12* | −20.173 | 0.100 | | | |
| | 13 | ∞ | 0.210 | 1.5168 | 64.2 | |
| | 14 | ∞ | 0.600 | | | |
| (IM) | | ∞ | | | | | f56 = −12.969 mm
T5 = 0.647 mm
T6 = 0.605 mm

TABLE 4

Aspherical surface data

| i | k | A4 | A6 | A8 | A10 | A12 | A14 | A16 |
|---|---|---|---|---|---|---|---|---|
| 1 | 0 | −2.692E−02 | 9.316E−03 | −8.017E−02 | 1.220E−01 | −1.226E−01 | 6.307E−02 | −1.235E−02 |
| 2 | 0 | −3.010E−02 | −1.722E−02 | −4.431E−03 | 2.087E−02 | −2.030E−02 | 1.343E−02 | −3.668E−03 |
| 3 | 0 | 3.456E−02 | −1.087E−02 | 9.471E−03 | 1.704E−03 | 1.842E−02 | −1.623E−02 | 3.470E−03 |
| 4 | 0 | 5.285E−02 | −8.893E−02 | 1.021E−01 | −9.374E−02 | 5.507E−02 | −1.598E−02 | 1.632E−03 |
| 5 | 0 | −1.652E−01 | 5.051E−02 | −3.245E−02 | 3.253E−02 | −1.103E−02 | 1.493E−03 | −9.939E−05 |
| 6 | 0 | −1.851E−01 | 1.116E−01 | −7.913E−02 | 5.353E−02 | −1.749E−02 | 7.893E−04 | 6.998E−04 |
| 7 | 0 | −1.136E−02 | −3.660E−02 | 7.062E−02 | −8.119E−02 | 3.936E−02 | −9.096E−03 | 5.715E−04 |
| 8 | 0 | −1.366E−01 | 1.250E−01 | −7.186E−02 | 8.515E−03 | 9.790E−03 | −5.874E−03 | 1.091E−03 |
| 9 | 0 | −2.500E−01 | 9.359E−02 | −4.967E−02 | 2.134E−02 | −7.284E−03 | 1.113E−03 | −5.552E−06 |
| 10 | 0 | −1.484E−01 | 2.914E−02 | −5.570E−03 | 3.415E−04 | 1.494E−04 | −2.686E−05 | 9.678E−07 |
| 11 | 0 | −2.392E−02 | 6.575E−03 | 1.564E−04 | 8.575E−05 | −3.812E−05 | 3.225E−06 | −4.240E−08 |
| 12 | 0 | −2.156E−02 | 7.804E−03 | −1.431E−03 | 6.737E−05 | 8.209E−06 | −1.059E−06 | 3.564E−08 |

The values of the respective conditional expressions are as follows:

R6r/f=−3.98

|R4f/R4r|=1.05

|f3/f2|=0.64 f3/f=−1.26 f3/f6=0.99 f6/f=−1.27

D34/f=0.16

D45/f=0.07

D56/f=0.09

T5/T6=1.07 f56/f=−2.56

Accordingly, the imaging lens of Numerical Data Example 2 satisfies the above-described conditional expressions. The distance on the optical axis X from the object-side surface of the first lens L1 to the image plane IM (air conversion length for the filter 10) is 5.732 mm, and downsizing of the imaging lens is attained.

Figure 5:
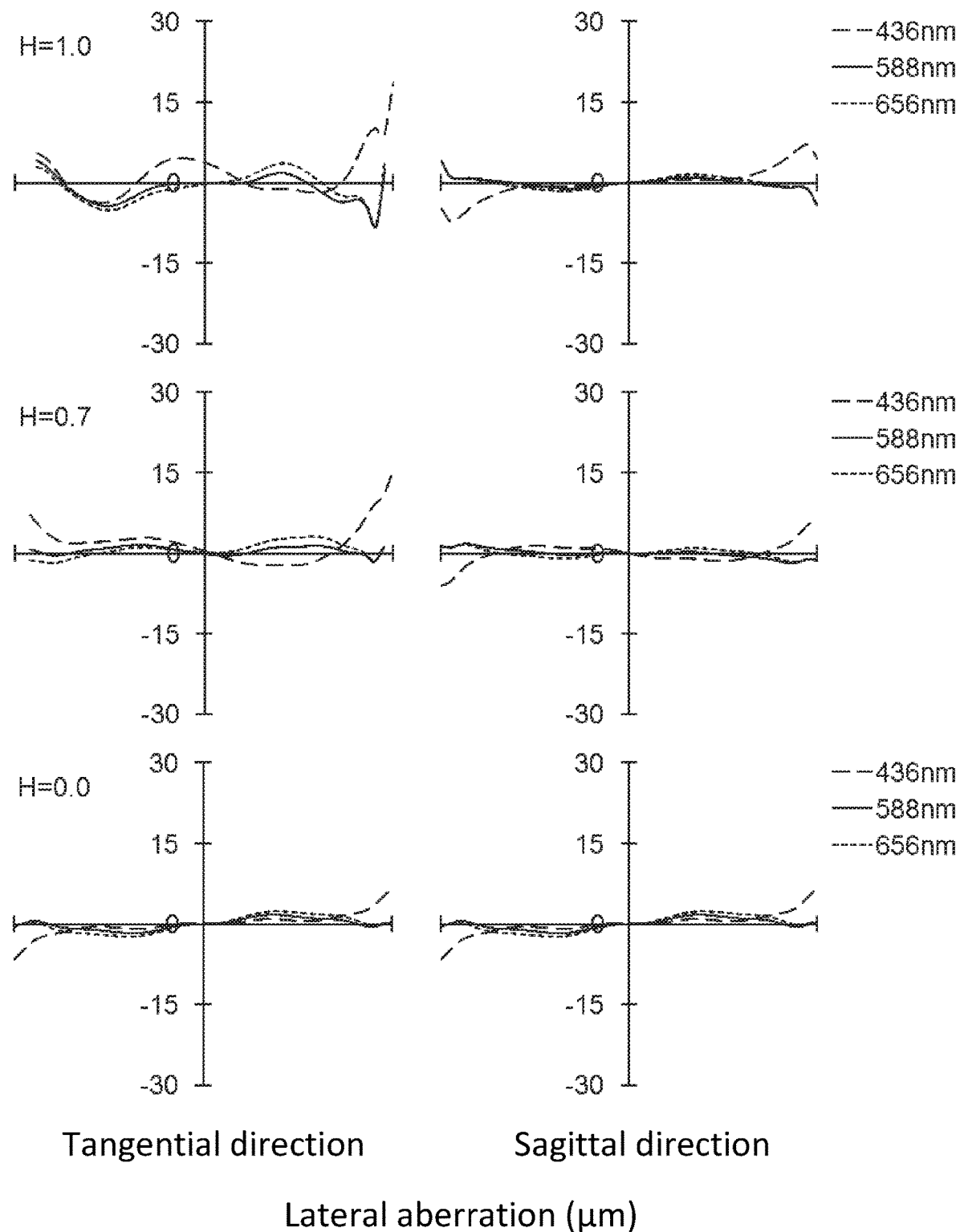
FIG. 5 is an aberration diagram showing a lateral aberration of the imaging lens of FIG. 4.
Figure 6:
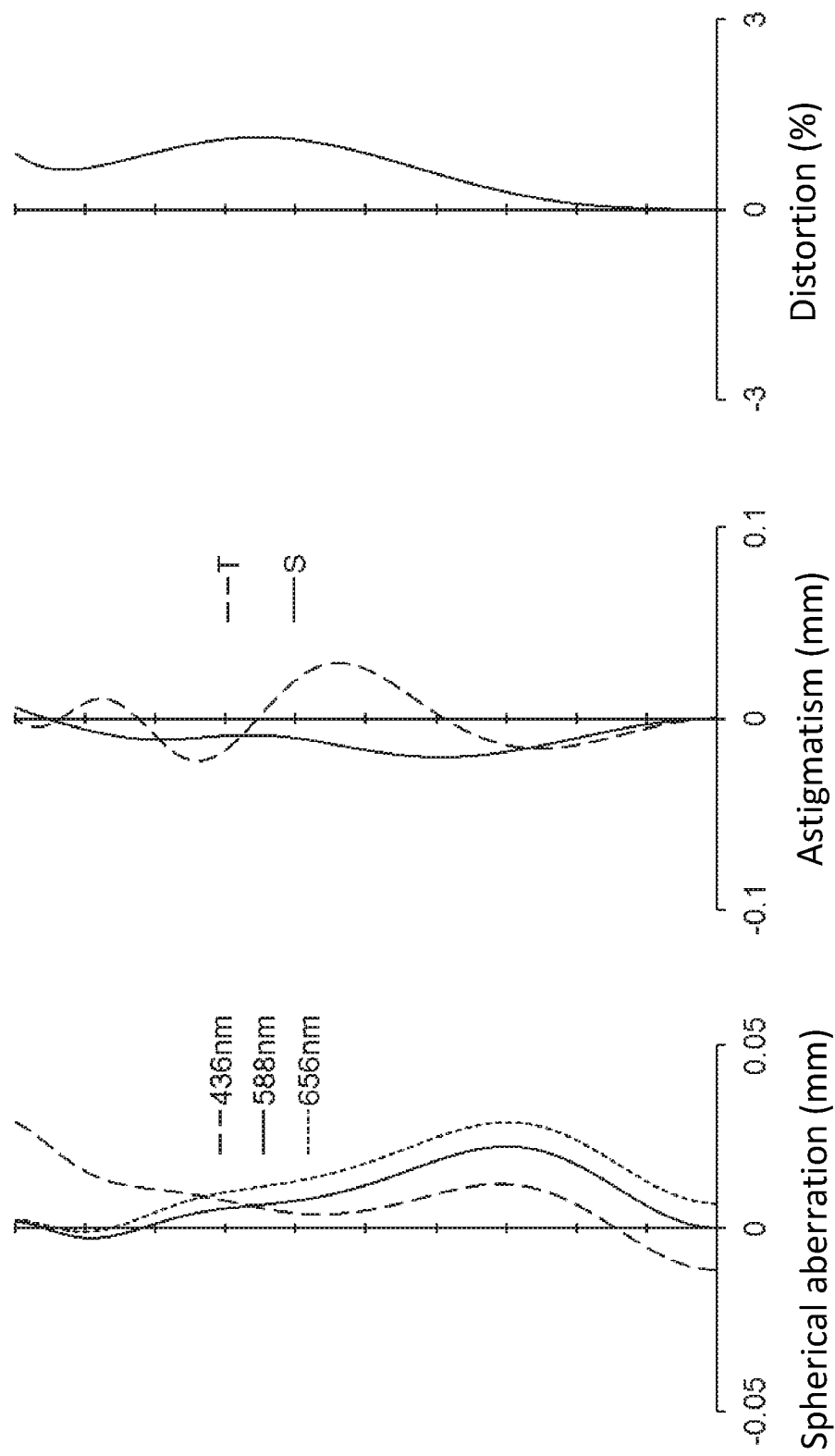
FIG. 6 is an aberration diagram showing a spherical aberration, astigmatism, and a distortion of the imaging lens of FIG. 4.
Figure 7:
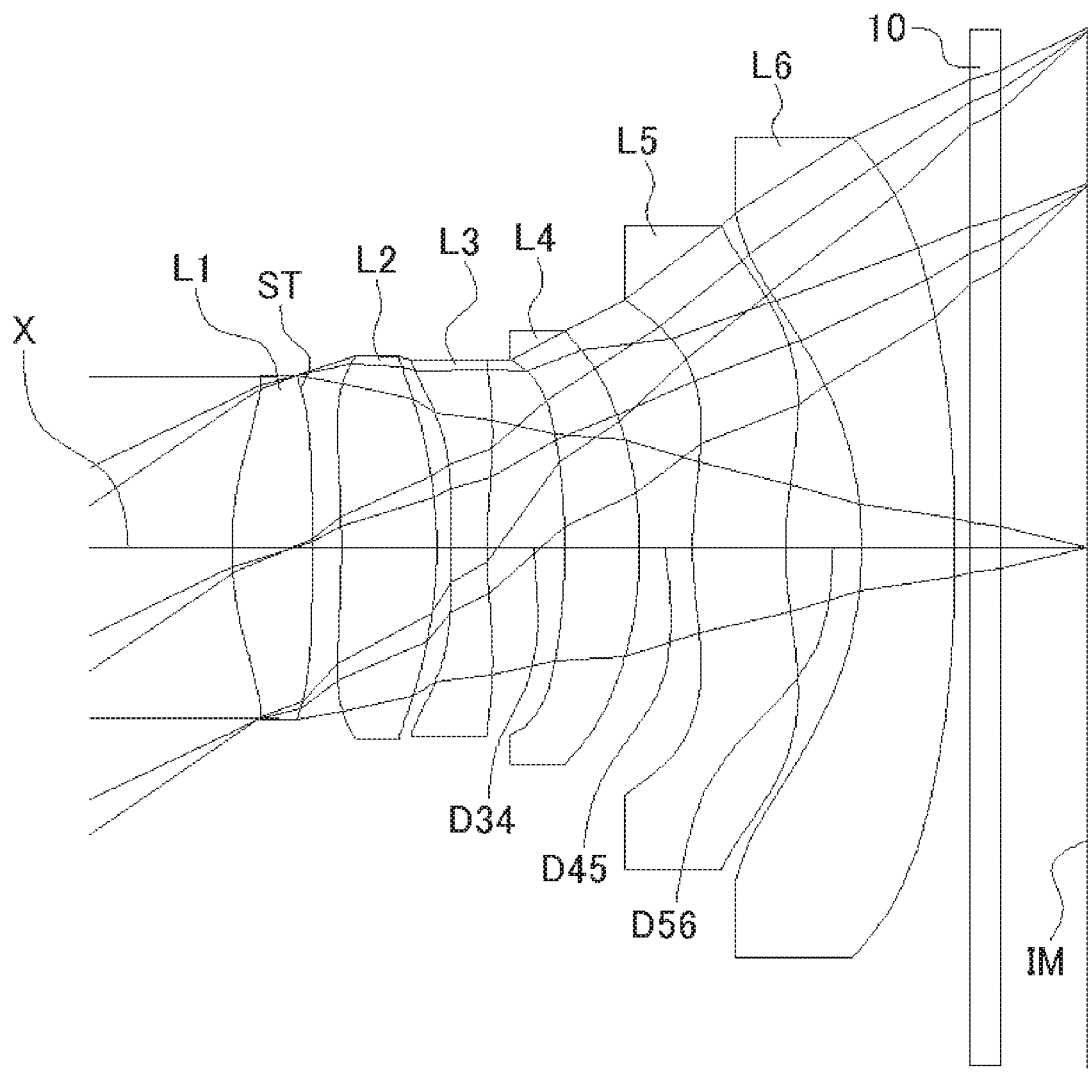
FIG. 7 shows a sectional view of a schematic configuration of an imaging lens in Numerical Data Example 3 of the present invention.

FIG. 5 shows a lateral aberration that corresponds to the image height ratio H, and FIG. 6 shows a spherical aberration (mm), astigmatism (mm), and a distortion (%), respectively. As shown in FIGS. 5 and 6, according to the imaging lens of Numerical Data Example 2, the aberrations are also satisfactorily corrected.

NUMERICAL DATA EXAMPLE 3

Basic Lens Data

TABLE 5 f = 5.02 mm Fno = 1.97 ω = 34.9°

| | i | r | d | nd | vd | [mm] |
|---|---|---|---|---|---|---|
| | | ∞ | ∞ | | | |
| L1 | 1* | 2.238 | 0.543 | 1.5348 | 55.7 | f1 = 4.018 |
| | 2* (ST) | −49.092 | 0.199 | | | |
| L2 | 3* | −7.363 | 0.648 | 1.5348 | 55.7 | f2 = 8.825 |
| | 4* | −2.964 | 0.102 | | | |
| L3 | 5* | −44.861 | 0.241 | 1.6503 | 21.5 | f3 = −5.153 |
| | 6* | 3.630 | 0.526 (=D34) | | | |
| L4 | 7* | −4.221 | 0.507 | 1.6142 | 25.6 | f4 = 19.645 |
| | 8* | −3.270 | 0.360 (=D45) | | | |
| L5 | 9* | 2.470 | 0.632 | 1.5348 | 55.7 | f5 = 40.930 |
| | 10* | 2.536 | 0.515 (=D56) | | | |
| L6 | 11* | −2.872 | 0.632 | 1.5348 | 55.7 | f6 = −6.368 |
| | 12* | −19.750 | 0.100 | | | |
| | 13 | ∞ | 0.210 | 1.5168 | 64.2 | |
| | 14 | ∞ | 0.589 | | | |
| (IM) | | ∞ | | | | | f56 = −8.554 mm
T5 = 0.632 mm
T6 = 0.632 mm

TABLE 6

Aspherical surface data

| i | k | A4 | A6 | A8 | A10 | A12 | A14 | A16 |
|---|---|---|---|---|---|---|---|---|
| 1 | 0 | −2.872E−02 | 5.810E−03 | −7.546E−02 | 1.114E−01 | −1.197E−01 | 6.404E−02 | −1.292E−02 |
| 2 | 0 | −2.332E−02 | −1.970E−02 | −8.639E−03 | 2.121E−02 | −2.367E−02 | 1.550E−02 | −4.017E−03 |
| 3 | 0 | 4.465E−02 | −6.590E−03 | 1.054E−02 | −1.721E−04 | 1.770E−02 | −1.531E−02 | 3.327E−03 |
| 4 | 0 | 4.829E−02 | −7.147E−02 | 8.883E−02 | −9.111E−02 | 5.869E−02 | −1.865E−02 | 2.218E−03 |
| 5 | 0 | −1.808E−01 | 4.898E−02 | −3.577E−02 | 4.245E−02 | −1.596E−02 | 3.539E−03 | −6.353E−04 |
| 6 | 0 | −1.713E−01 | 9.174E−02 | −5.773E−02 | 2.435E−02 | 3.641E−03 | −7.007E−03 | 2.033E−03 |
| 7 | 0 | 3.805E−02 | −6.926E−02 | 9.963E−02 | −1.215E−01 | 6.509E−02 | −1.810E−02 | 1.056E−03 |
| 8 | 0 | −7.863E−02 | 8.382E−02 | −4.335E−02 | 1.588E−03 | 8.100E−03 | −5.489E−03 | 1.314E−03 |
| 9 | 0 | −2.269E−01 | 9.307E−02 | −4.732E−02 | 1.905E−02 | −5.908E−03 | 8.398E−04 | −4.881E−06 |
| 10 | 0 | −1.460E−01 | 3.083E−02 | −6.181E−03 | 3.532E−04 | 1.673E−04 | −2.864E−05 | 9.672E−07 |
| 11 | 0 | −2.305E−02 | 5.205E−03 | 6.072E−04 | 6.299E−06 | −2.724E−05 | 2.324E−06 | −1.965E−08 |
| 12 | 0 | −2.737E−02 | 9.732E−03 | −1.593E−03 | 5.875E−05 | 9.749E−06 | −1.080E−06 | 3.212E−08 |

The values of the respective conditional expressions are as follows:

R6r/f=−3.93

|R4f/R4r|=1.29

|f3/f2|=0.58 f3/f=−1.03
f3/f6=0.81 f6/f=−1.27
D34/f=0.10
D45/f=0.07
D56/f=0.10
T5/T6=1.00
f56/f=−1.70

Accordingly, the imaging lens of Numerical Data Example 3 satisfies the above-described conditional expressions. The distance on the optical axis X from the object-side surface of the first lens L1 to the image plane IM (air conversion length for the filter 10) is 5.732 mm, and downsizing of the imaging lens is attained.

Figure 8:
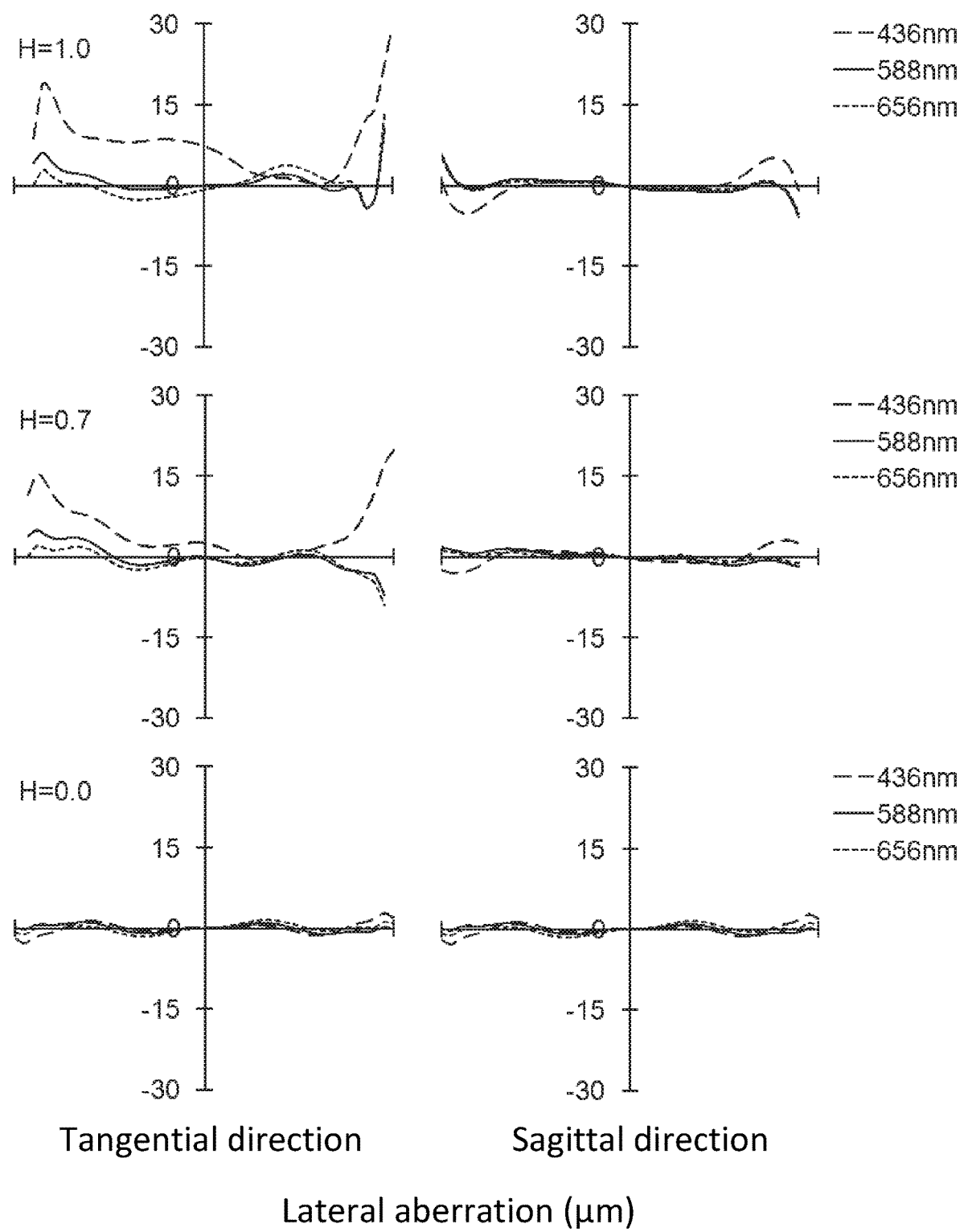
FIG. 8 is an aberration diagram showing a lateral aberration of the imaging lens of FIG. 7.
Figure 9:
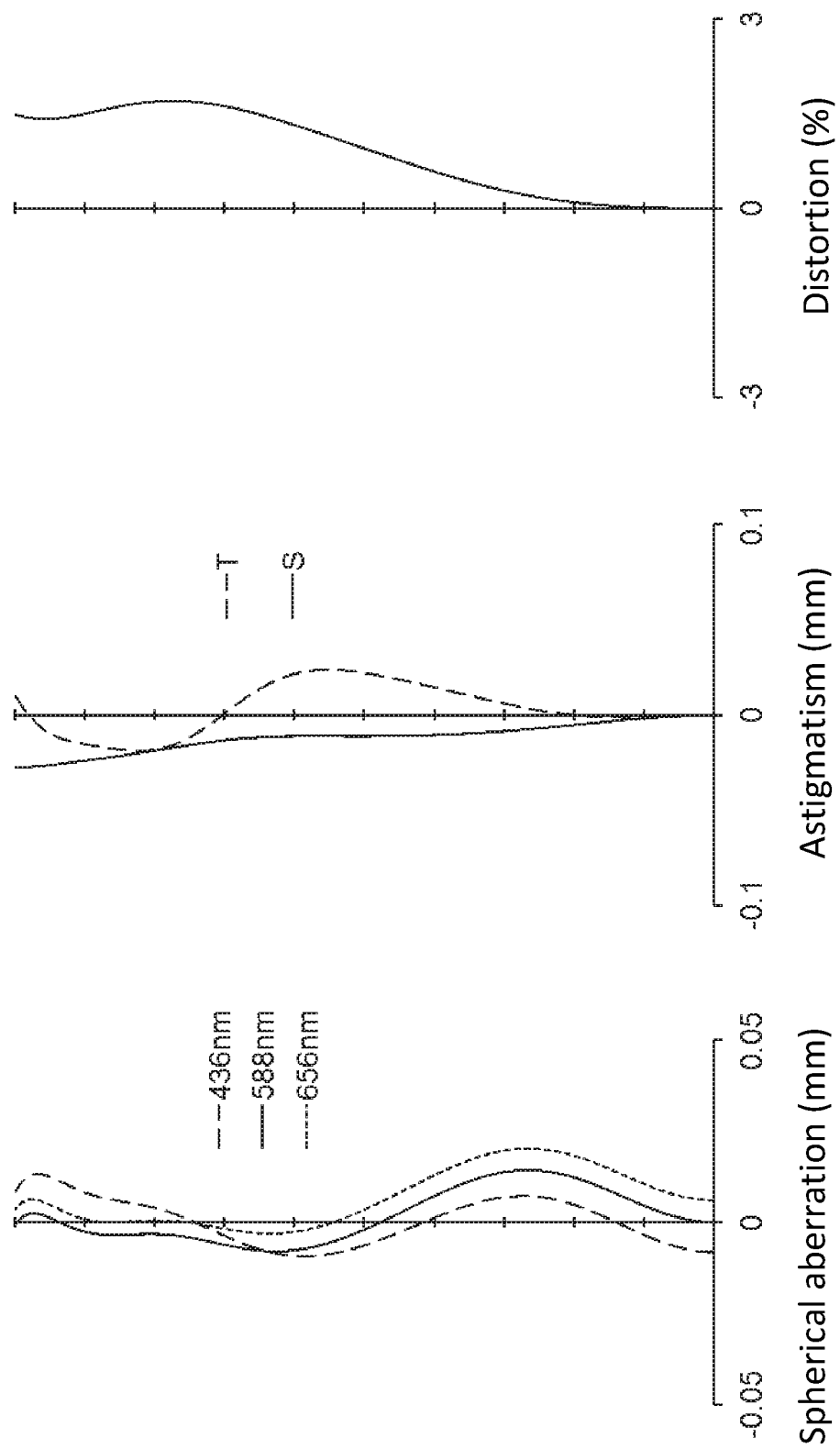
FIG. 9 is an aberration diagram showing a spherical aberration, astigmatism, and a distortion of the imaging lens of FIG. 7.
Figure 10:
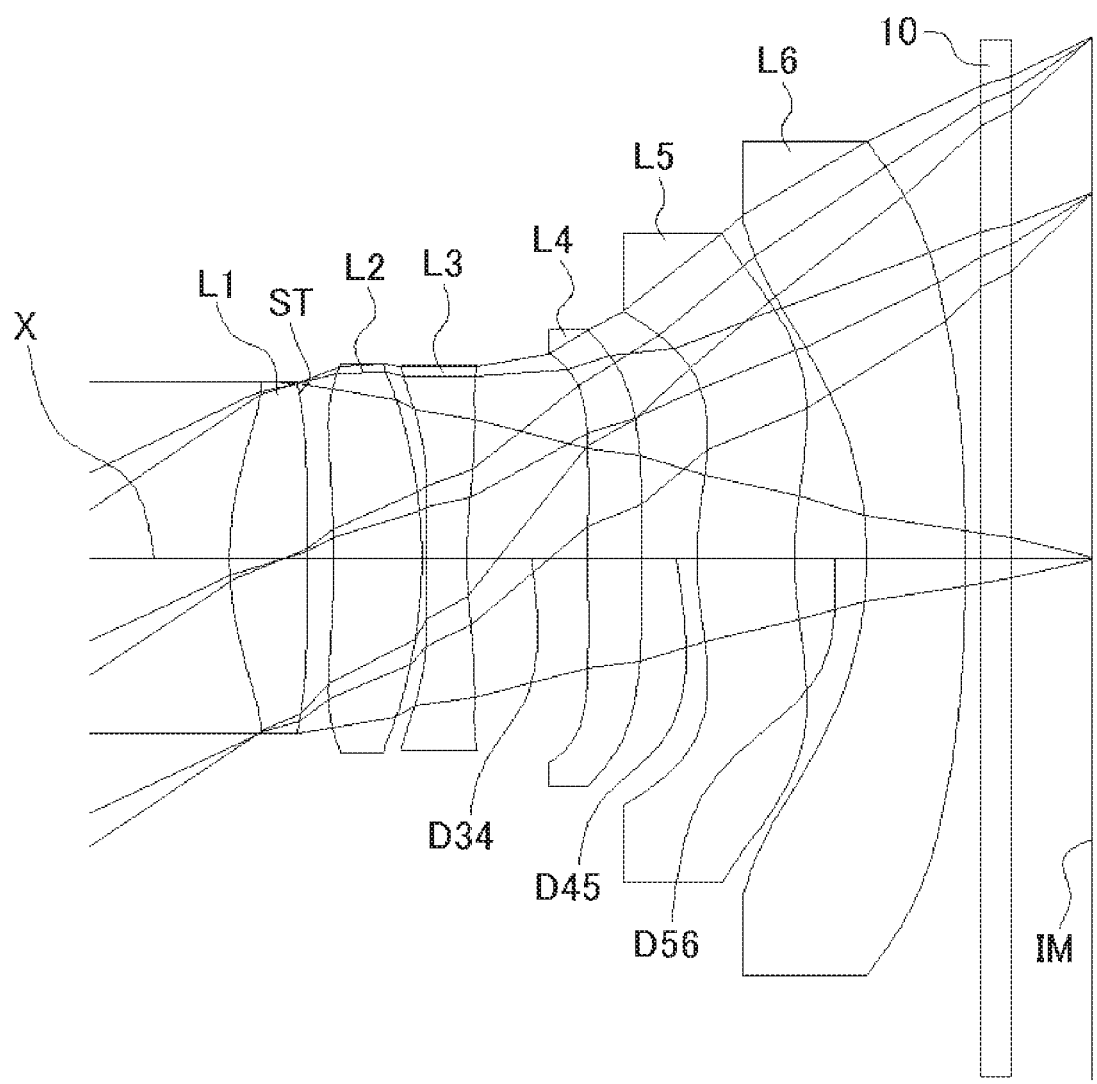
FIG. 10 shows a sectional view of a schematic configuration of an imaging lens in Numerical Data Example 4 of the present invention.

FIG. 8 shows a lateral aberration that corresponds to the image height ratio H, and FIG. 9 shows a spherical aberration (mm), astigmatism (mm), and a distortion (%), respectively. As shown in FIGS. 8 and 9, according to the imaging lens of Numerical Data Example 3, the aberrations are also satisfactorily corrected.

NUMERICAL DATA EXAMPLE 4

Basic Lens Data

TABLE 7 f = 5.13 mm Fno = 2.00 ω = 34.3°

|   | i | r | d | nd | vd | [mm] |
|---|---|---|---|----|----|------|
| L1 | 1* | ∞ | ∞ | | | |
|    |    | 2.238 | 0.518 | 1.5348 | 55.7 | f1 = 4.367 |
|    | 2* (ST) | 49.357 | 0.182 | | | |
| L2 | 3* | −7.010 | 0.597 | 1.5348 | 55.7 | f2 = 10.087 |
|    | 4* | −3.139 | 0.031 | | | |
| L3 | 5* | 11.516 | 0.273 | 1.6503 | 21.5 | f3 = −6.710 |
|    | 6* | 3.135 | 0.818 (=D34) | | | |
| L4 | 7* | 47.016 | 0.362 | 1.6142 | 25.6 | f4 = −101.330 |
|    | 8* | 26.705 | 0.372 (=D45) | | | |
| L5 | 9* | 2.121 | 0.659 | 1.5348 | 55.7 | f5 = 15.810 |
|    | 10* | 2.524 | 0.486 (=D56) | | | |
| L6 | 11* | −2.912 | 0.666 | 1.5348 | 55.7 | f6 = −6.557 |
|    | 12* | −18.541 | 0.100 | | | |

TABLE 7-continued f = 5.13 mm Fno = 2.00 ω = 34.3°

|   | i | r | d | nd | vd | [mm] |
|---|---|---|---|----|----|------|
|   | 13 | ∞ | 0.210 | 1.5168 | 64.2 | |
|   | 14 | ∞ | 0.542 | | | |
| (IM) |   | ∞ | | | | | f56 = −14.525 mm
T5 = 0.659 mm
T6 = 0.666 mm

TABLE 8

Aspherical surface data

| i | k | A4 | A6 | A8 | A10 | A12 | A14 | A16 |
|---|---|----|----|----|-----|-----|-----|-----|
| 1 | 0 | −2.688E−02 | 8.887E−03 | −8.019E−02 | 1.214E−01 | −1.226E−01 | 6.317E−02 | −1.233E−02 |
| 2 | 0 | −2.989E−02 | −1.808E−02 | −4.497E−03 | 2.086E−02 | −2.045E−02 | 1.337E−02 | −3.563E−03 |
| 3 | 0 | 3.497E−02 | −9.953E−03 | 9.446E−03 | 1.577E−03 | 1.838E−02 | −1.625E−02 | 3.461E−03 |
| 4 | 0 | 5.312E−02 | −8.872E−02 | 1.023E−01 | −9.381E−02 | 5.499E−02 | −1.606E−02 | 1.649E−03 |
| 5 | 0 | −1.660E−01 | 5.095E−02 | −3.198E−02 | 3.272E−02 | −1.096E−02 | 1.476E−03 | −1.253E−04 |
| 6 | 0 | −1.851E−01 | 1.117E−01 | −7.777E−02 | 5.380E−02 | −1.767E−02 | 7.232E−04 | 7.930E−04 |
| 7 | 0 | −1.576E−02 | −3.730E−02 | 7.054E−02 | −8.131E−02 | 3.932E−02 | −9.131E−03 | 5.440E−04 |
| 8 | 0 | −1.409E−01 | 1.247E−01 | −7.193E−02 | 8.501E−03 | 9.786E−03 | −5.871E−03 | 1.093E−03 |
| 9 | 0 | −2.501E−01 | 9.351E−02 | −4.968E−02 | 2.133E−02 | −7.286E−03 | 1.113E−03 | −5.593E−06 |
| 10 | 0 | −1.478E−01 | 2.914E−02 | −5.581E−03 | 3.404E−04 | 1.492E−04 | −2.688E−05 | 9.633E−07 |
| 11 | 0 | −2.394E−02 | 6.574E−03 | 1.563E−04 | 8.575E−05 | −3.816E−05 | 3.224E−06 | −4.213E−08 |
| 12 | 0 | −2.118E−02 | 7.842E−03 | −1.430E−03 | 6.739E−05 | 8.190E−06 | −1.058E−06 | 3.557E−08 |

The values of the respective conditional expressions are as follows:
R6r/f=−3.61
|R4f/R4r|=1.76
|f3/f2|=0.67
|f3/f=−1.31
f3/f6=1.02
f6/f=−1.28
D34/f=0.16
D45/f=0.07
D56/f=0.09
T5/T6=0.99
f56/f=−2.83

Accordingly, the imaging lens of Numerical Data Example 4 satisfies the above-described conditional expressions. The distance on the optical axis X from the object-side surface of the first lens L1 to the image plane IM (air conversion length for the filter 10) is 5.744 mm, and downsizing of the imaging lens is attained.

Figure 11:
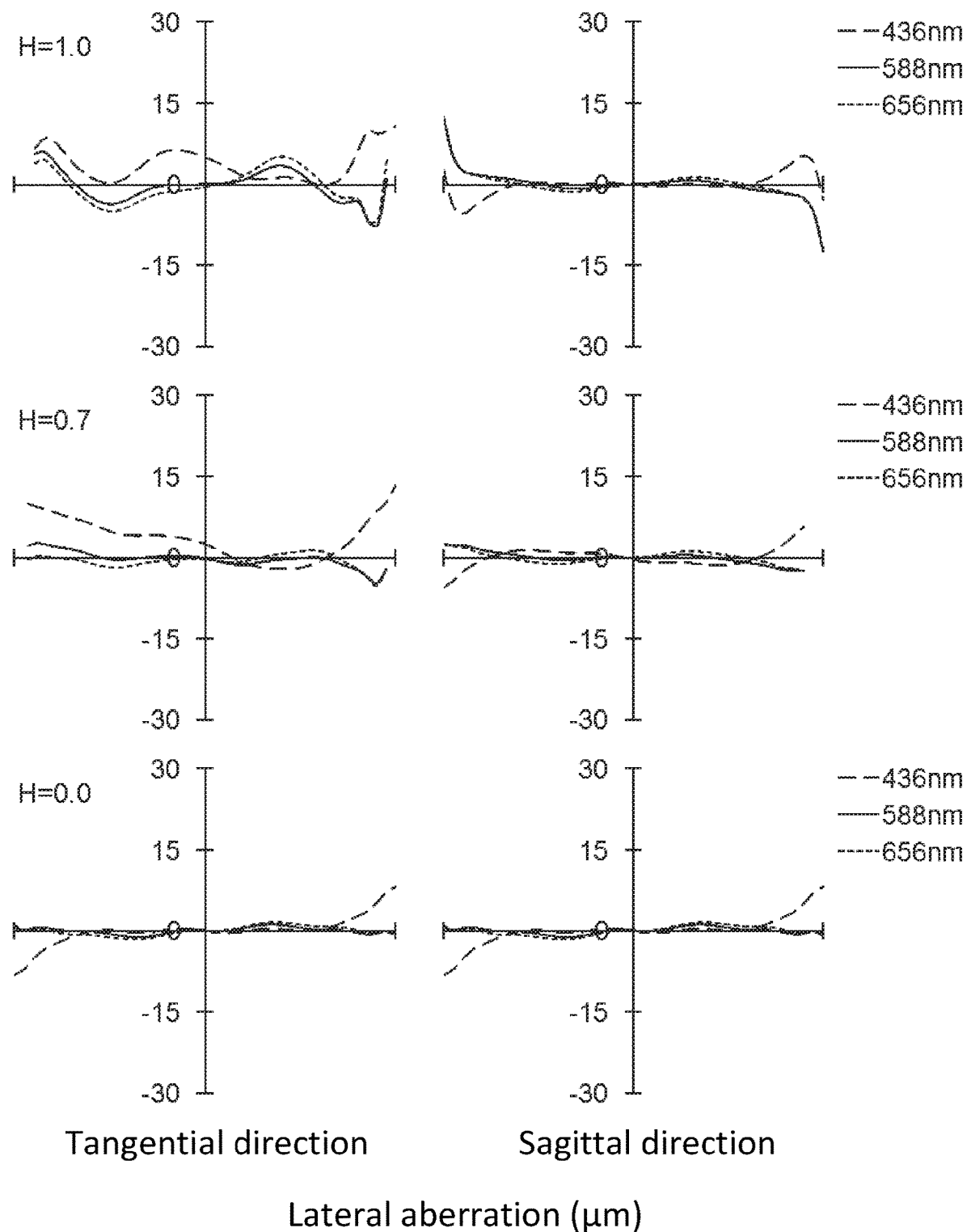
FIG. 11 is an aberration diagram showing a lateral aberration of the imaging lens of FIG. 10.
Figure 12:
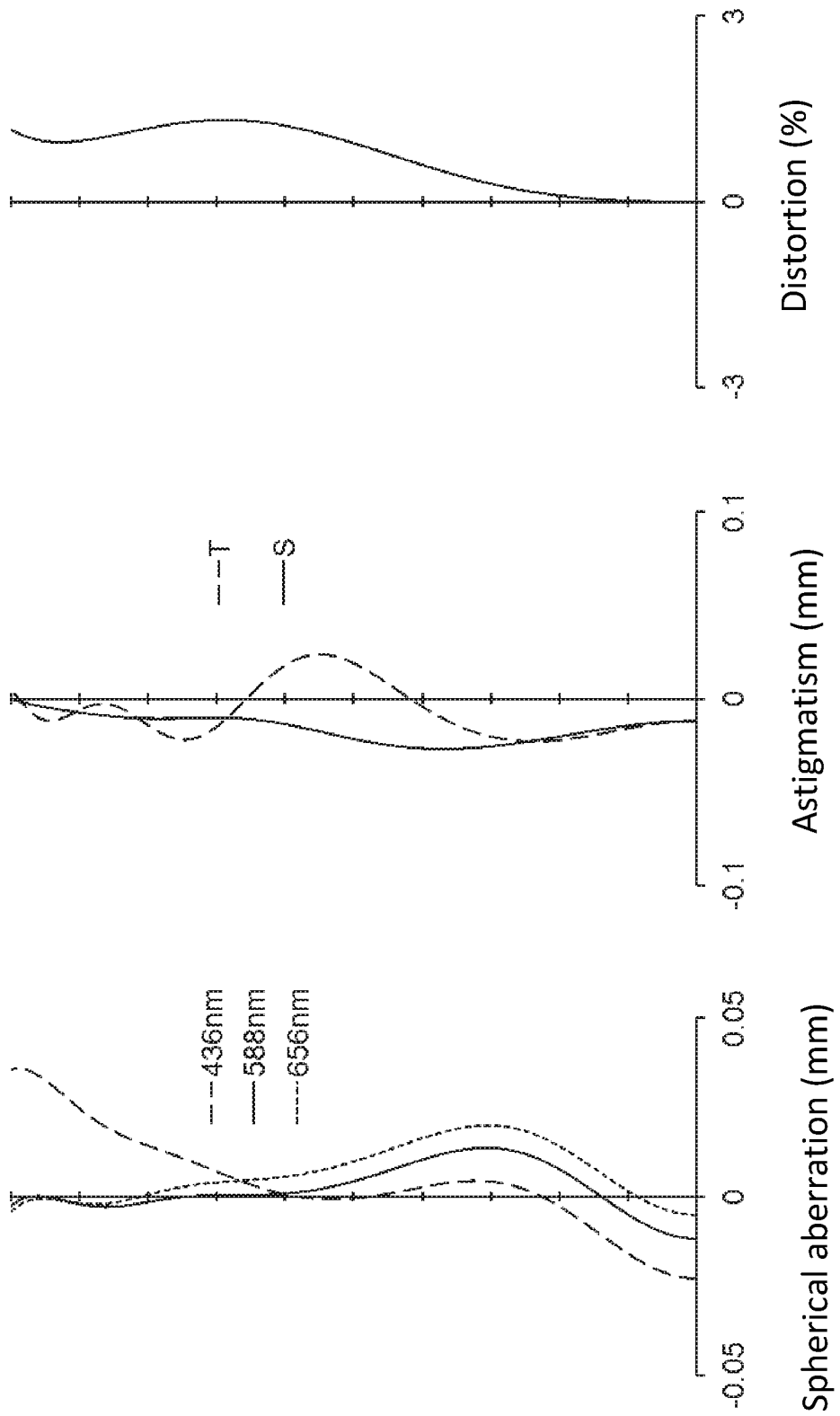
FIG. 12 is an aberration diagram showing a spherical aberration, astigmatism, and a distortion of the imaging lens of FIG. 10.
Figure 13:
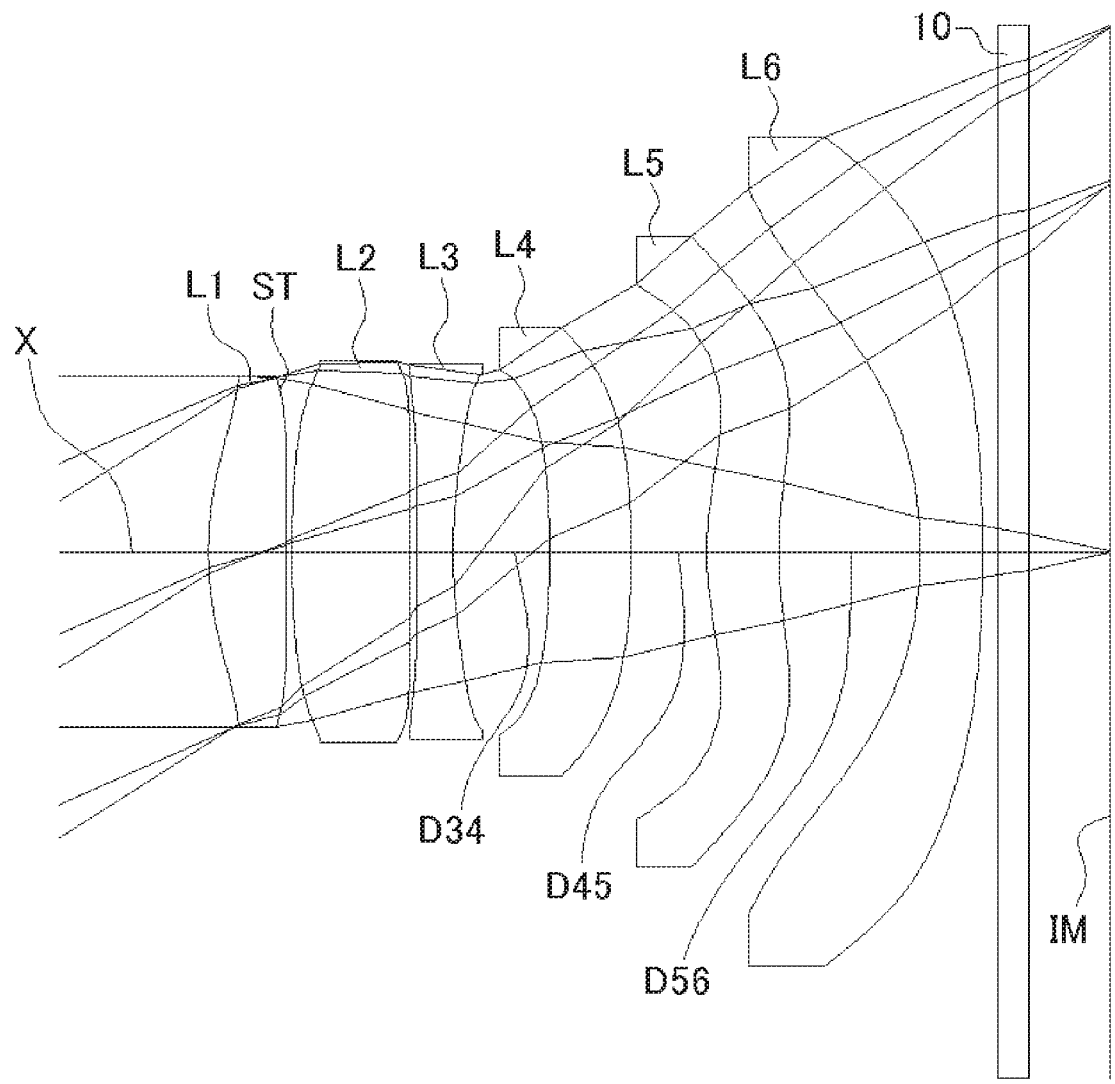
FIG. 13 shows a sectional view of a schematic configuration of an imaging lens in Numerical Data Example 5 of the present invention.

FIG. 11 shows a lateral aberration that corresponds to the image height ratio H, and FIG. 12 shows a spherical aberration (mm), astigmatism (mm), and a distortion (%), respectively. As shown in FIGS. 11 and 12, according to the imaging lens of Numerical Data Example 4, the aberrations are also satisfactorily corrected.

NUMERICAL DATA EXAMPLE 5

Basic Lens Data

TABLE 9 f = 5.49 mm Fno = 2.17 ω = 32.6°

|   | i | r | d | nd | vd | [mm] |
|---|---|---|---|----|----|------|
|   |   | ∞ | ∞ | | | |
| L1 | 1* | 2.287 | 0.519 | 1.5348 | 55.7 | f1 = 4.637 |
|    | 2* (ST) | 27.158 | 0.038 | | | |

TABLE 9-continued

| | | f = 5.49 mm Fno = 2.17 ω = 32.6° | | | | |
|---|---|---|---|---|---|---|
| | i | r | d | nd | vd | [mm] |
| L2 | 3* | 8.632 | 0.779 | 1.5348 | 55.7 | f2 = 17.539 |
| | 4* | 104.900 | 0.046 | | | |
| L3 | 5* | 11.690 | 0.247 | 1.6503 | 21.5 | f3 = −7.508 |
| | 6* | 3.415 | 0.642 | (=D34) | | |
| L4 | 7* | −7.379 | 0.542 | 1.6142 | 25.6 | f4 = −63.845 |
| | 8* | −9.343 | 0.503 | (=D45) | | |
| L5 | 9* | 2.000 | 0.481 | 1.5348 | 55.7 | f5 = 11.565 |
| | 10* | 2.708 | 0.941 | (=D56) | | |
| L6 | 11* | −2.855 | 0.414 | 1.5348 | 55.7 | f6 = −6.698 |
| | 12* | −14.763 | 0.100 | | | |
| | 13 | ∞ | 0.210 | 1.5168 | 64.2 | |
| | 14 | ∞ | 0.544 | | | |
| (IM) | | ∞ | | | | | f56 = −25.637 mm
T5 = 0.481 mm
T6 = 0.414 mm

TABLE 10

Aspherical surface data

| i | k | A4 | A6 | A8 | A10 | A12 | A14 | A16 |
|---|---|---|---|---|---|---|---|---|
| 1 | 0 | −2.793E−02 | 7.178E−04 | −8.124E−02 | 1.294E−01 | −1.213E−01 | 5.877E−02 | −1.138E−02 |
| 2 | 0 | −4.139E−02 | 3.907E−03 | −2.790E−02 | 5.134E−02 | −5.109E−02 | 2.425E−02 | −4.553E−03 |
| 3 | 0 | 1.045E−02 | 3.201E−02 | −2.796E−02 | 5.620E−02 | −5.726E−02 | 2.699E−02 | −5.298E−03 |
| 4 | 0 | 7.741E−03 | −5.130E−02 | 1.086E−01 | −1.286E−01 | 7.041E−02 | −2.013E−02 | 2.451E−03 |
| 5 | 0 | −1.031E−01 | 4.931E−02 | −2.892E−02 | 2.893E−02 | −1.453E−02 | 4.166E−03 | −7.346E−04 |
| 6 | 0 | −8.813E−02 | 7.940E−02 | −5.528E−02 | 1.216E−03 | 6.403E−02 | −5.382E−02 | 1.518E−02 |
| 7 | 0 | −5.052E−02 | −1.158E−02 | 2.845E−02 | −6.309E−02 | 4.081E−02 | −1.279E−02 | 2.917E−04 |
| 8 | 0 | −1.237E−01 | 8.648E−02 | −4.983E−02 | 5.278E−03 | 9.637E−03 | −5.935E−03 | 1.153E−03 |
| 9 | 0 | −2.241E−01 | 8.108E−02 | −4.820E−02 | 2.106E−02 | −5.895E−03 | 7.952E−04 | −3.267E−05 |
| 10 | 0 | −1.472E−01 | 2.706E−02 | −5.371E−03 | 4.066E−04 | 1.575E−04 | −2.967E−05 | 8.922E−07 |
| 11 | 0 | −3.244E−02 | 5.627E−03 | 5.941E−04 | −2.230E−06 | −2.509E−05 | 2.290E−06 | −2.102E−08 |
| 12 | 0 | −3.044E−02 | 9.192E−03 | −1.559E−03 | 5.812E−05 | 9.549E−06 | −1.041E−06 | 3.161E−08 |

The values of the respective conditional expressions are as follows:
R6r/f=−2.69
|R4f/R4r|=0.79
|f3/f2|=0.43
f3/f=−1.37
f3/f6=1.12
f6/f=−1.22
D34/f=0.12
D45/f=0.09
D56/f=0.17
T5/T6=1.16
f56/f=−4.67

Accordingly, the imaging lens of Numerical Data Example 5 satisfies the above-described conditional expressions. The distance on the optical axis X from the object-side surface of the first lens L1 to the image plane IM (air conversion length for the filter 10) is 5.934 mm, and downsizing of the imaging lens is attained.

Figure 14:
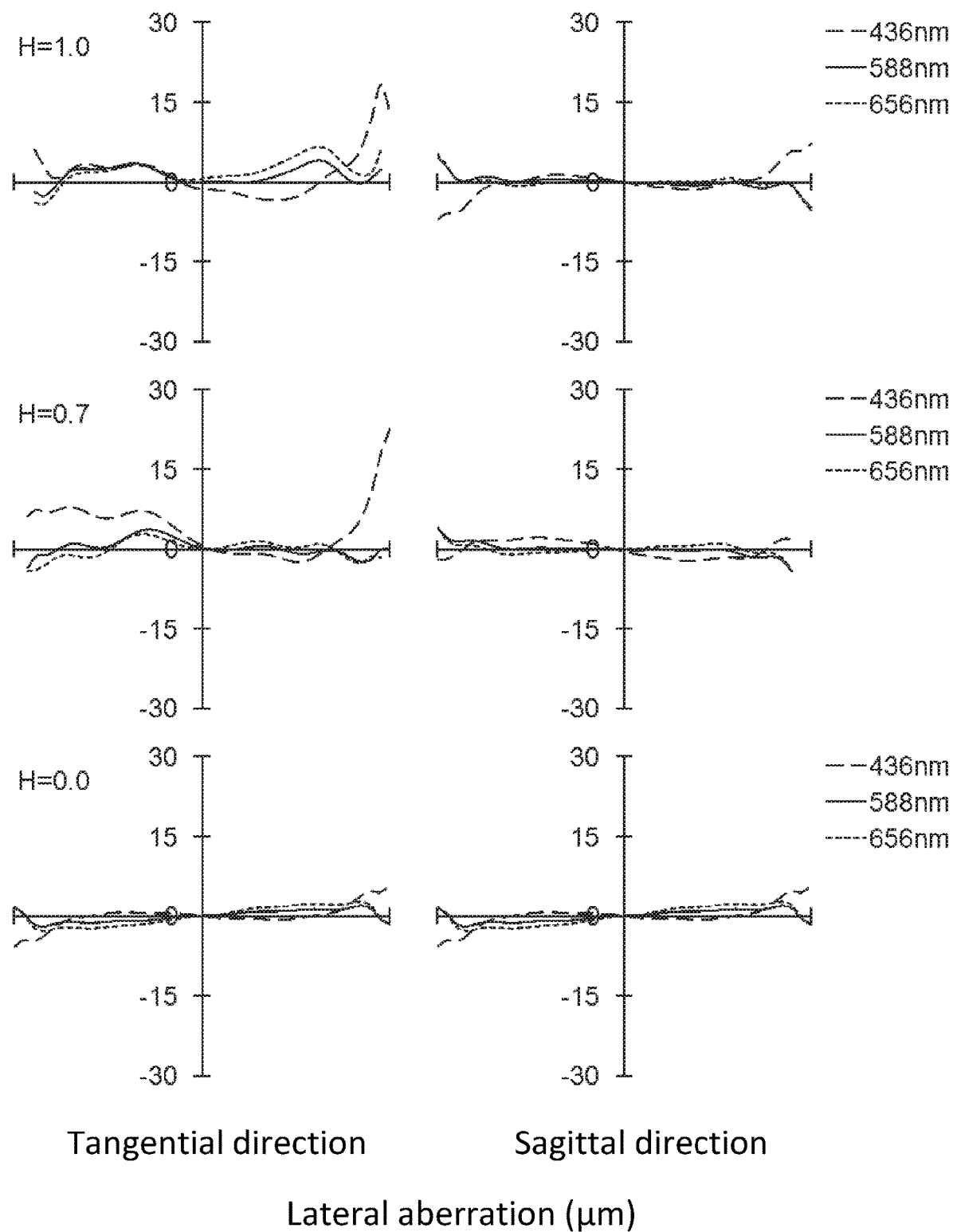
FIG. 14 is an aberration diagram showing a lateral aberration of the imaging lens of FIG. 13.
Figure 15:
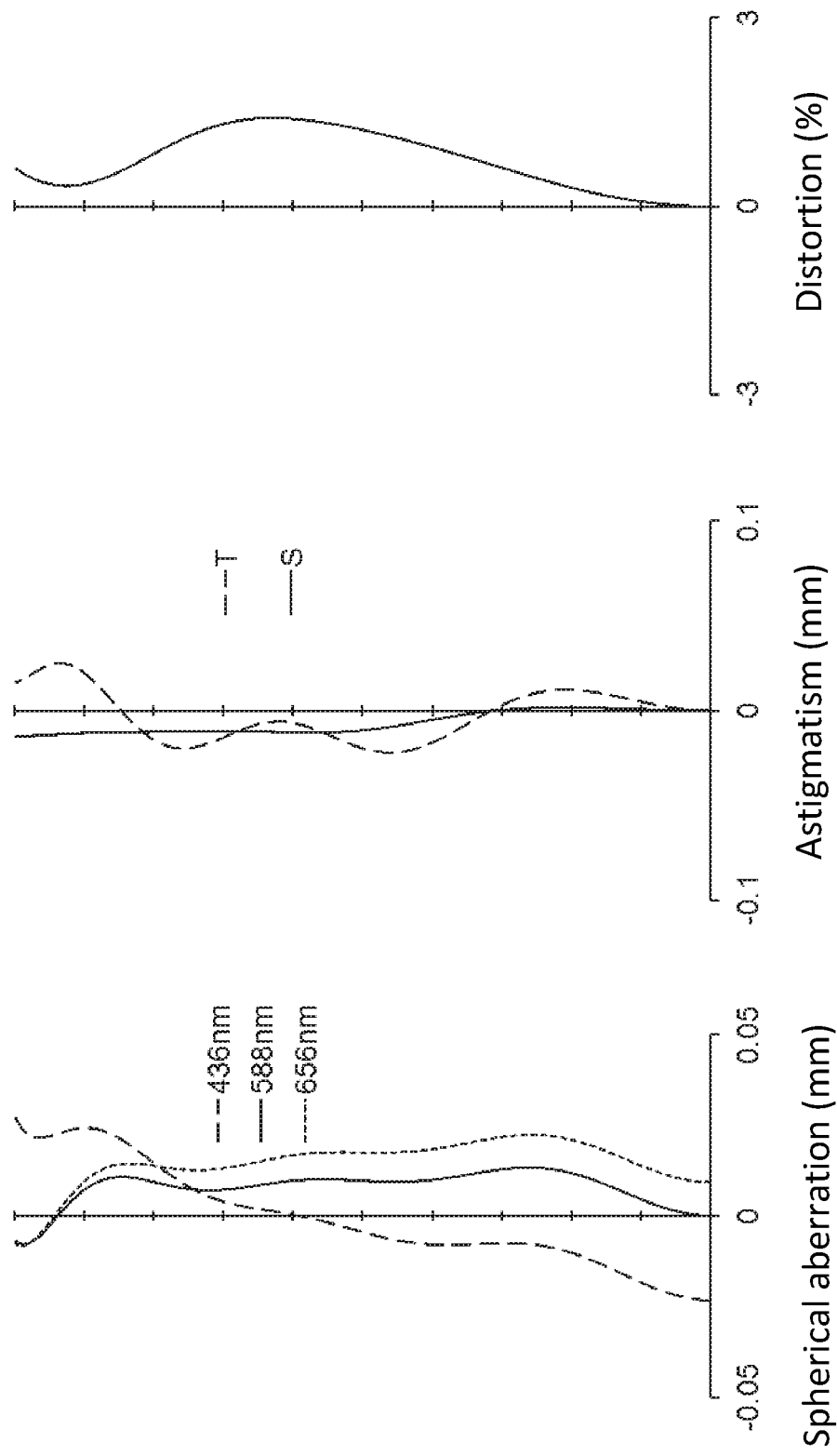
FIG. 15 is an aberration diagram showing a spherical aberration, astigmatism, and a distortion of the imaging lens of FIG. 13.
Figure 16:
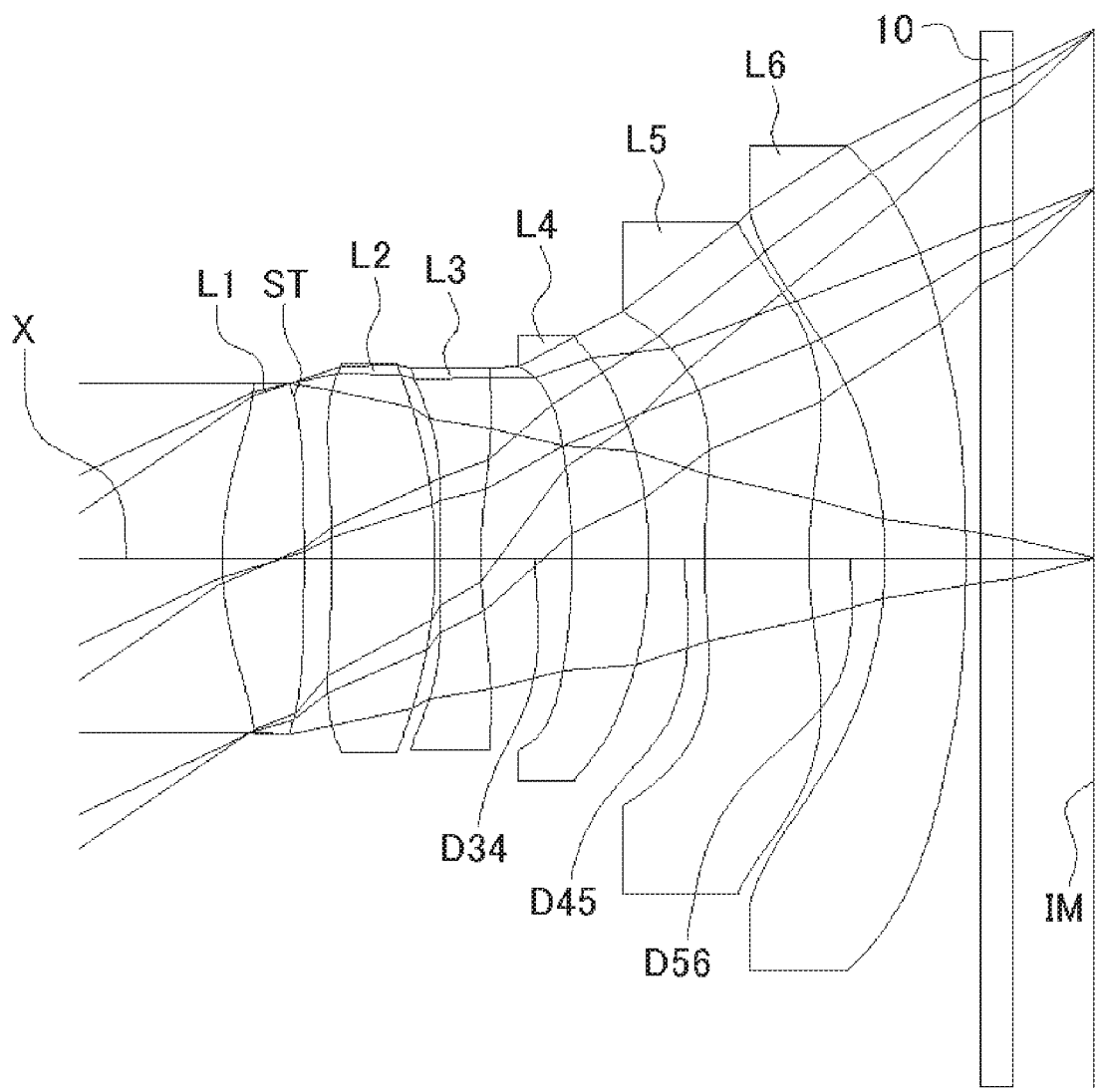
FIG. 16 shows a sectional view of a schematic configuration of an imaging lens in Numerical Data Example 6 of the present invention.

FIG. 14 shows a lateral aberration that corresponds to the image height ratio H, and FIG. 15 shows a spherical aberration (mm), astigmatism (mm), and a distortion (%), respectively. As shown in FIGS. 14 and 15, according to the imaging lens of Numerical Data Example 5, the aberrations are also satisfactorily corrected.

NUMERICAL DATA EXAMPLE 6

Basic Lens Data

TABLE 11

| | | f = 5.08 mm Fno = 1.99 ω = 34.6° | | | | |
|---|---|---|---|---|---|---|
| | i | r | d | nd | vd | [mm] |
| | | ∞ | ∞ | | | |
| L1 | 1* | 2.209 | 0.542 | 1.5348 | 55.7 | f1 = 4.001 |
| | 2* (ST) | −62.450 | 0.187 | | | |
| L2 | 3* | −7.010 | 0.689 | 1.5348 | 55.7 | f2 = 9.472 |
| | 4* | −3.041 | 0.030 | | | |

TABLE 11-continued

| | | f = 5.08 mm Fno = 1.99 ω = 34.6° | | | | |
|---|---|---|---|---|---|---|
| | i | r | d | nd | vd | [mm] |
| L3 | 5* | 10.459 | 0.274 | 1.6503 | 21.5 | f3 = −5.822 |
| | 6* | 2.751 | 0.607 | (=D34) | | |
| L4 | 7* | −4.332 | 0.512 | 1.6142 | 25.6 | f4 = 17.675 |
| | 8* | −3.235 | 0.369 | (=D45) | | |
| L5 | 9* | 3.293 | 0.698 | 1.5348 | 55.7 | f5 = −34.703 |
| | 10* | 2.590 | 0.506 | (=D56) | | |
| L6 | 11* | −2.963 | 0.539 | 1.5348 | 55.7 | f6 = −7.457 |
| | 12* | −12.256 | 0.100 | | | |
| | 13 | ∞ | 0.210 | 1.5168 | 64.2 | |
| | 14 | ∞ | 0.544 | | | |
| (IM) | | ∞ | | | | | f56 = −6.471 mm
T5 = 0.698 mm
T6 = 0.539 mm

TABLE 12

Aspherical surface data

| i | k | A4 | A6 | A8 | A10 | A12 | A14 | A16 |
|---|---|---|---|---|---|---|---|---|
| 1 | 0 | −2.596E−02 | 2.757E−03 | −7.329E−02 | 1.144E−01 | −1.207E−01 | 6.250E−02 | −1.210E−02 |
| 2 | 0 | −2.507E−02 | −1.746E−02 | −8.533E−03 | 2.027E−02 | −1.992E−02 | 1.208E−02 | −3.009E−03 |
| 3 | 0 | 4.373E−02 | −9.242E−03 | 1.118E−02 | 2.401E−04 | 1.740E−02 | −1.554E−02 | 3.395E−03 |
| 4 | 0 | 5.239E−02 | −8.086E−02 | 9.592E−02 | −8.975E−02 | 5.428E−02 | −1.737E−02 | 2.179E−03 |
| 5 | 0 | −1.763E−01 | 4.782E−02 | −3.744E−02 | 3.990E−02 | −1.545E−02 | 3.732E−03 | −6.114E−04 |
| 6 | 0 | −1.802E−01 | 9.505E−02 | −5.914E−02 | 2.331E−02 | 4.798E−03 | −7.399E−03 | 2.062E−03 |
| 7 | 0 | 3.553E−02 | −6.708E−02 | 9.821E−02 | −1.189E−01 | 6.506E−02 | −1.899E−02 | 1.520E−03 |
| 8 | 0 | −6.748E−02 | 7.804E−02 | −4.361E−02 | 3.026E−03 | 7.772E−03 | −5.511E−03 | 1.306E−03 |
| 9 | 0 | −2.259E−01 | 1.122E−01 | −7.908E−02 | 4.740E−02 | −1.918E−02 | 3.802E−03 | −2.417E−04 |
| 10 | 0 | −1.436E−01 | 3.085E−02 | −6.254E−03 | 3.463E−04 | 1.686E−04 | −2.837E−05 | 9.943E−07 |
| 11 | 0 | −1.051E−02 | −3.019E−03 | 1.839E−03 | 1.404E−05 | −4.169E−05 | 3.352E−06 | −5.474E−08 |
| 12 | 0 | −2.600E−02 | 9.413E−03 | −1.578E−03 | 6.033E−05 | 9.496E−06 | −1.076E−06 | 3.288E−08 |

The values of the respective conditional expressions are as follows:

R6r/f=−2.41

|R4f/R4r|=1.34

|f3/f2|=0.61 f3/f=−1.15 f3/f6=0.78 f6/f=−1.47

D34/f=0.12

D45/f=0.07

D56/f=0.10

T5/T6=1.29 f56/f=−1.27

Accordingly, the imaging lens of Numerical Data Example 6 satisfies the above-described conditional expressions. The distance on the optical axis X from the object-side surface of the first lens L1 to the image plane IM (air conversion length for the filter 10) is 5.735 mm, and downsizing of the imaging lens is attained.

Figure 17:
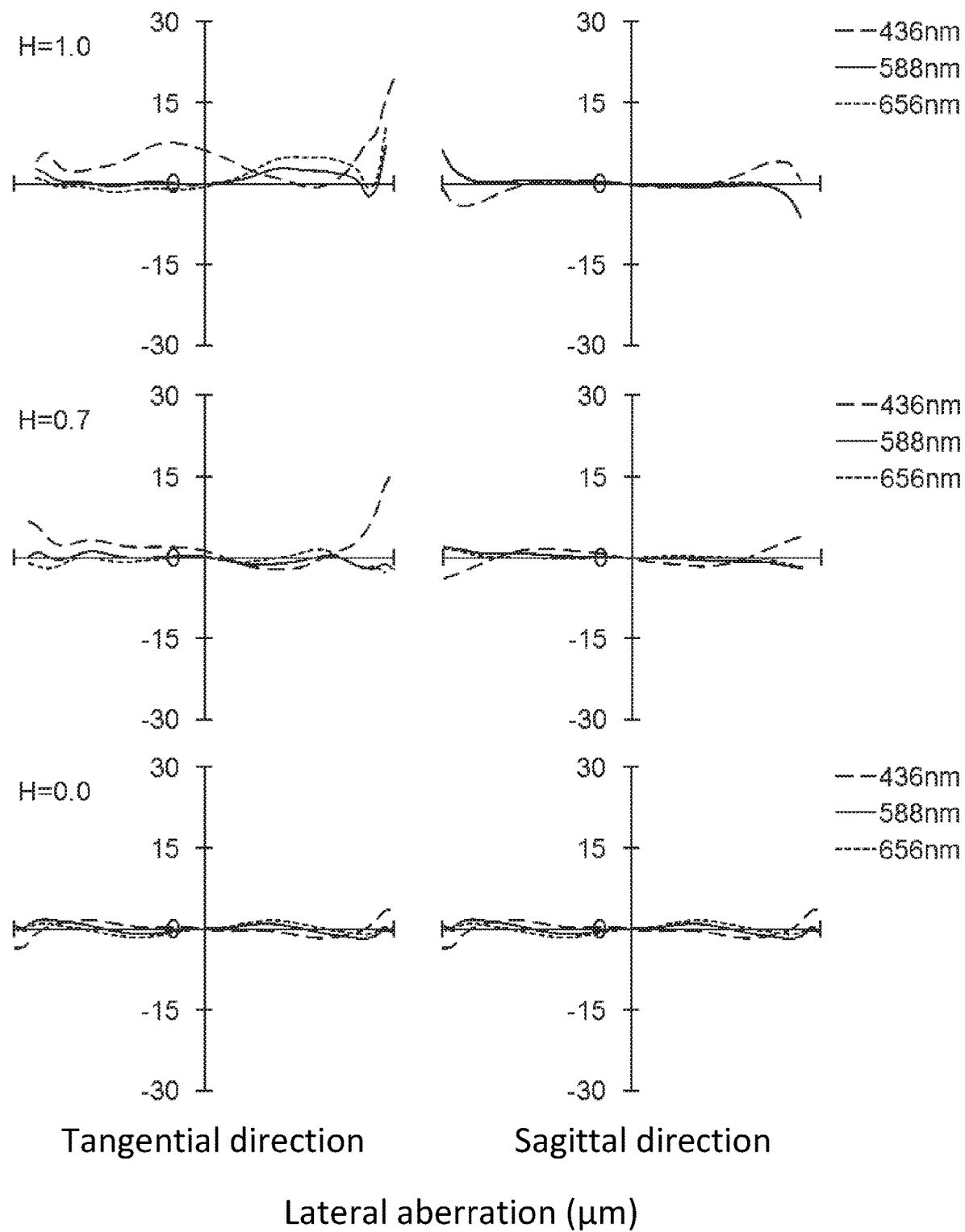
FIG. 17 is an aberration diagram showing a lateral aberration of the imaging lens of FIG. 16.
Figure 18:
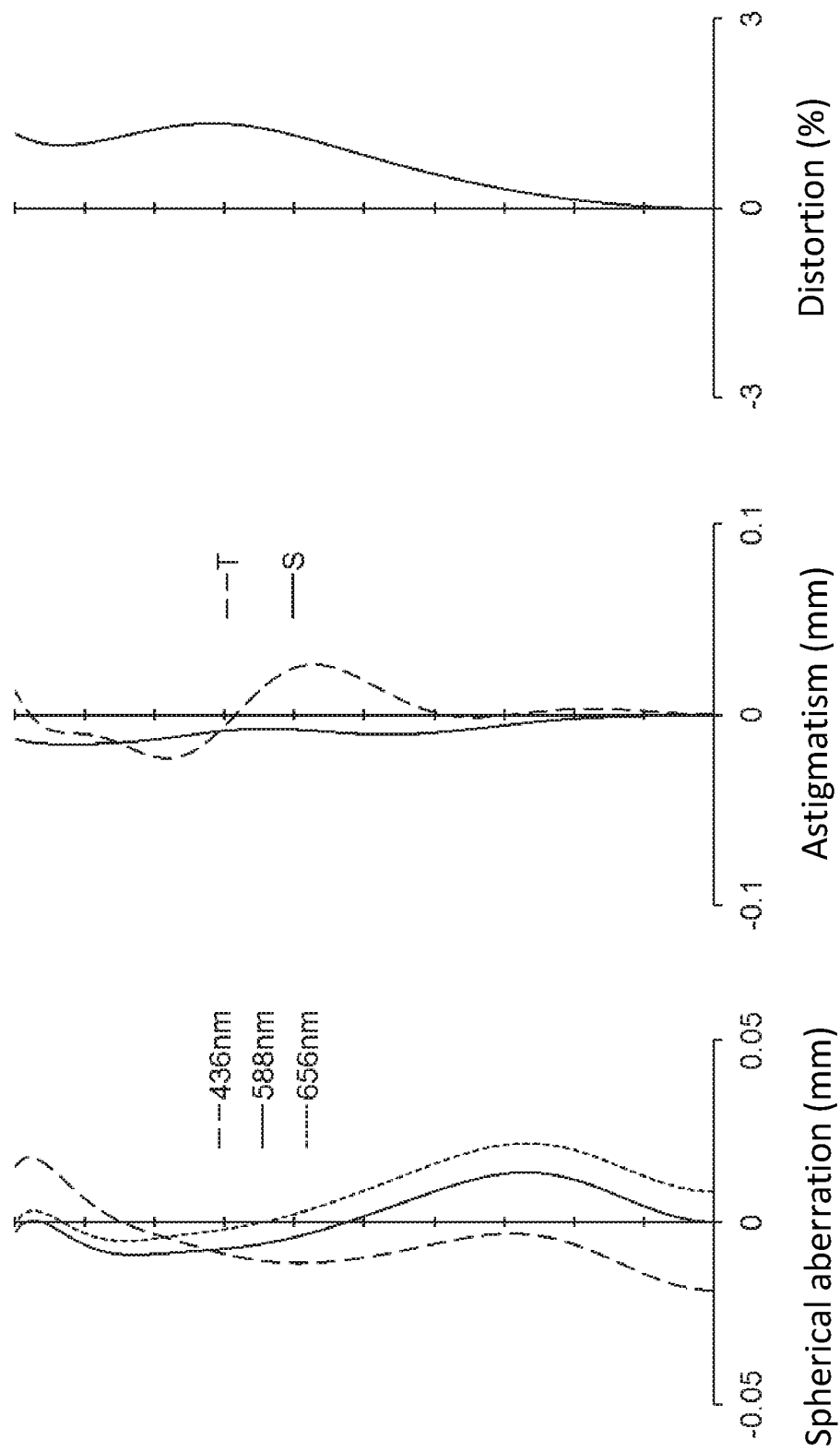
FIG. 18 is an aberration diagram showing a spherical aberration, astigmatism, and a distortion of the imaging lens of FIG. 16.
Figure 19:
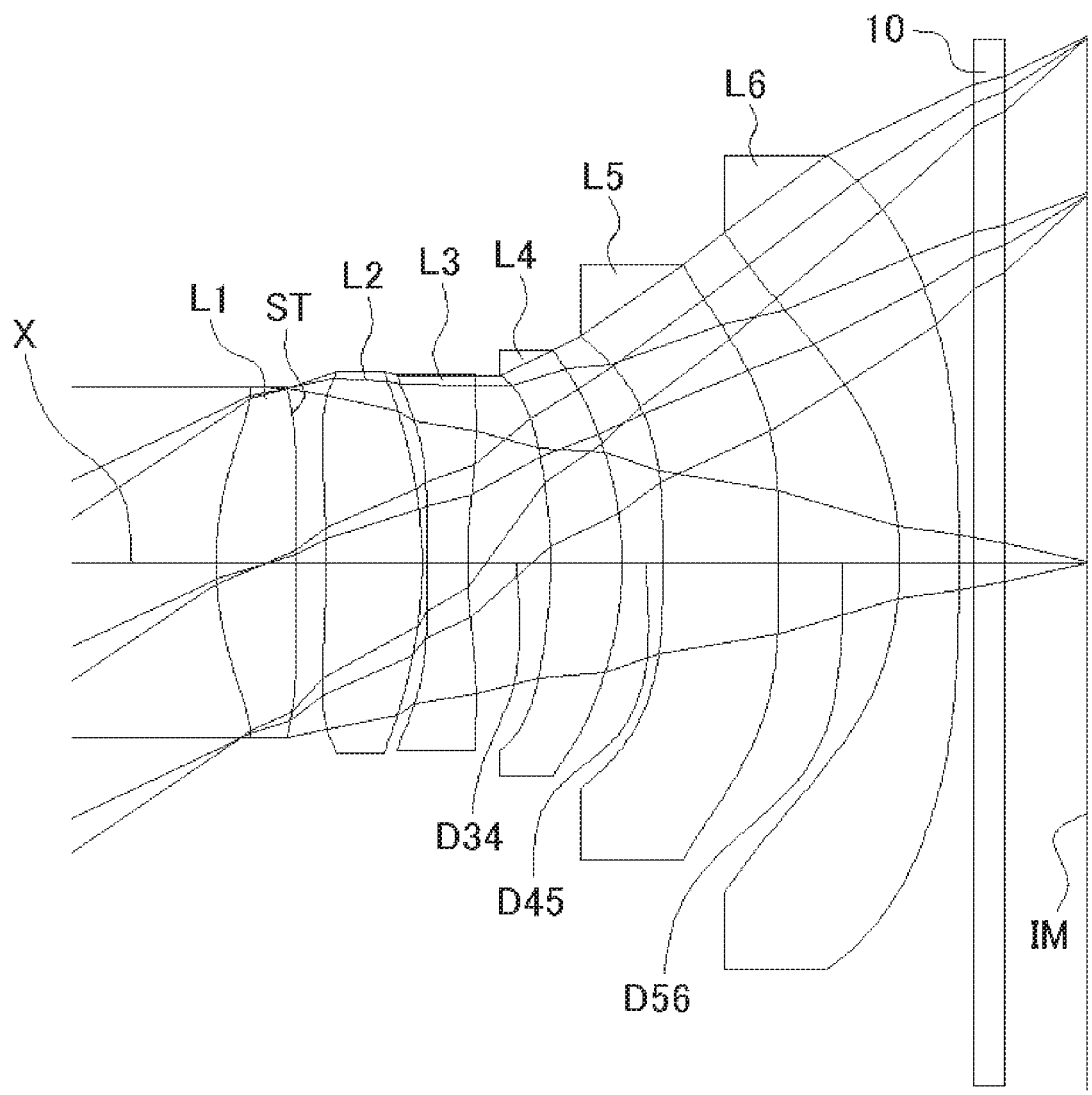
FIG. 19 shows a sectional view of a schematic configuration of an imaging lens in Numerical Data Example 7 of the present invention.

FIG. 17 shows a lateral aberration that corresponds to the image height ratio H, and FIG. 18 shows a spherical aberration (mm), astigmatism (mm), and a distortion (%), respectively. As shown in FIGS. 17 and 18, according to the imaging lens of Numerical Data Example 6, the aberrations are also satisfactorily corrected.

NUMERICAL DATA EXAMPLE 7

Basic Lens Data

TABLE 13 f = 5.10 mm Fno = 1.99 ω = 34.5°

| | i | r | d | nd | vd | [mm] |
|---|---|---|---|---|---|---|
| | | ∞ | ∞ | | | |
| L1 | 1* | 2.125 | 0.534 | 1.5348 | 55.7 | f1 = 4.132 |
| | 2* (ST) | 50.377 | 0.198 | | | |
| L2 | 3* | −8.418 | 0.641 | 1.5348 | 55.7 | f2 = 8.159 |
| | 4* | −2.950 | 0.030 | | | |
| L3 | 5* | 16.499 | 0.273 | 1.6503 | 21.5 | f3 = −5.651 |
| | 6* | 2.986 | 0.552 (=D34) | | | |
| L4 | 7* | −3.574 | 0.477 | 1.6142 | 25.6 | f4 = 12.047 |
| | 8* | −2.532 | 0.273 (=D45) | | | |
| L5 | 9* | −29.841 | 0.775 | 1.5348 | 55.7 | f5 = −228.717 |
| | 10* | −39.827 | 0.804 (=D56) | | | |
| L6 | 11* | −2.553 | 0.394 | 1.5348 | 55.7 | f6 = −5.242 |
| | 12* | −30.151 | 0.100 | | | |
| | 13 | ∞ | 0.210 | 1.5168 | 64.2 | |
| | 14 | ∞ | 0.545 | | | |
| (IM) | | ∞ | | | | | f56 = −5.063 mm
T5 = 0.775 mm
T6 = 0.394 mm

TABLE 14

Aspherical surface data

| i | k | A4 | A6 | A8 | A10 | A12 | A14 | A16 |
|---|---|---|---|---|---|---|---|---|
| 1 | 0 | −2.256E−02 | 1.101E−02 | −8.904E−02 | 1.367E−01 | −1.362E−01 | 6.745E−02 | −1.282E−02 |
| 2 | 0 | −2.096E−02 | −1.863E−02 | −7.421E−03 | 2.117E−02 | −2.215E−02 | 1.385E−02 | −3.585E−03 |
| 3 | 0 | 3.715E−02 | −5.004E−03 | 6.698E−03 | −1.751E−04 | 2.257E−02 | −1.857E−02 | 3.900E−03 |
| 4 | 0 | 4.774E−02 | −7.266E−02 | 9.292E−02 | −9.145E−02 | 5.784E−02 | −1.890E−02 | 2.306E−03 |
| 5 | 0 | −1.724E−01 | 4.875E−02 | −2.364E−02 | 2.381E−02 | −8.693E−03 | 3.145E−03 | −8.407E−04 |
| 6 | 0 | −1.748E−01 | 9.749E−02 | −6.128E−02 | 2.437E−02 | 4.100E−03 | −6.963E−03 | 1.967E−03 |
| 7 | 0 | 3.289E−02 | −5.090E−02 | 8.599E−02 | −1.176E−01 | 6.456E−02 | −1.768E−02 | 1.431E−03 |
| 8 | 0 | −4.464E−02 | 7.835E−02 | −4.262E−02 | 8.000E−04 | 7.613E−03 | −5.454E−03 | 1.565E−03 |
| 9 | 0 | −1.865E−01 | 1.368E−01 | −1.069E−01 | 6.038E−02 | −2.243E−02 | 3.539E−03 | 3.101E−05 |
| 10 | 0 | −1.051E−01 | 3.022E−02 | −5.853E−03 | 4.123E−04 | 1.710E−04 | −3.185E−05 | 7.277E−07 |
| 11 | 0 | −5.623E−02 | 1.462E−02 | 1.978E−04 | 4.776E−06 | −7.447E−05 | 1.126E−05 | −3.647E−07 |
| 12 | 0 | −2.865E−02 | 7.320E−03 | −1.266E−03 | 6.345E−05 | 8.429E−06 | −1.209E−06 | 3.517E−08 |

The values of the respective conditional expressions are as follows:

R6r/f=−5.91
|R4f/R4r|=1.41
|f3/f2|=0.69
f3/f=−1.11
f3/f6=1.08
f6/f=−1.03
D34/f=0.11
D45/f=0.05
D56/f=0.16
T5/T6=1.97
f56/f=−0.99

Accordingly, the imaging lens of Numerical Data Example 7 satisfies the above-described conditional expressions. The distance on the optical axis X from the object-side surface of the first lens L1 to the image plane IM (air conversion length for the filter 10) is 5.734 mm, and downsizing of the imaging lens is attained.

Figure 20:
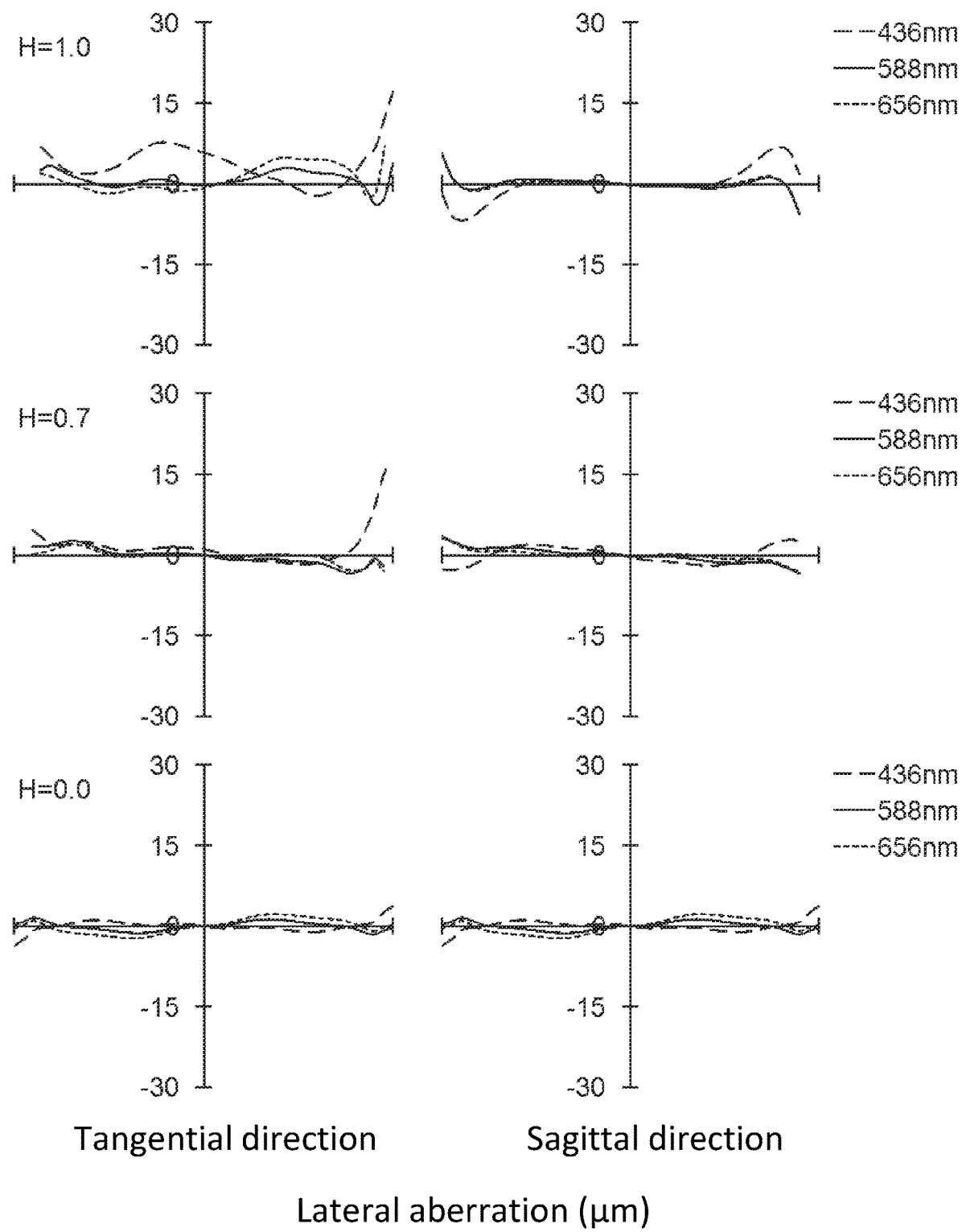
FIG. 20 is an aberration diagram showing a lateral aberration of the imaging lens of FIG. 19.
Figure 21:
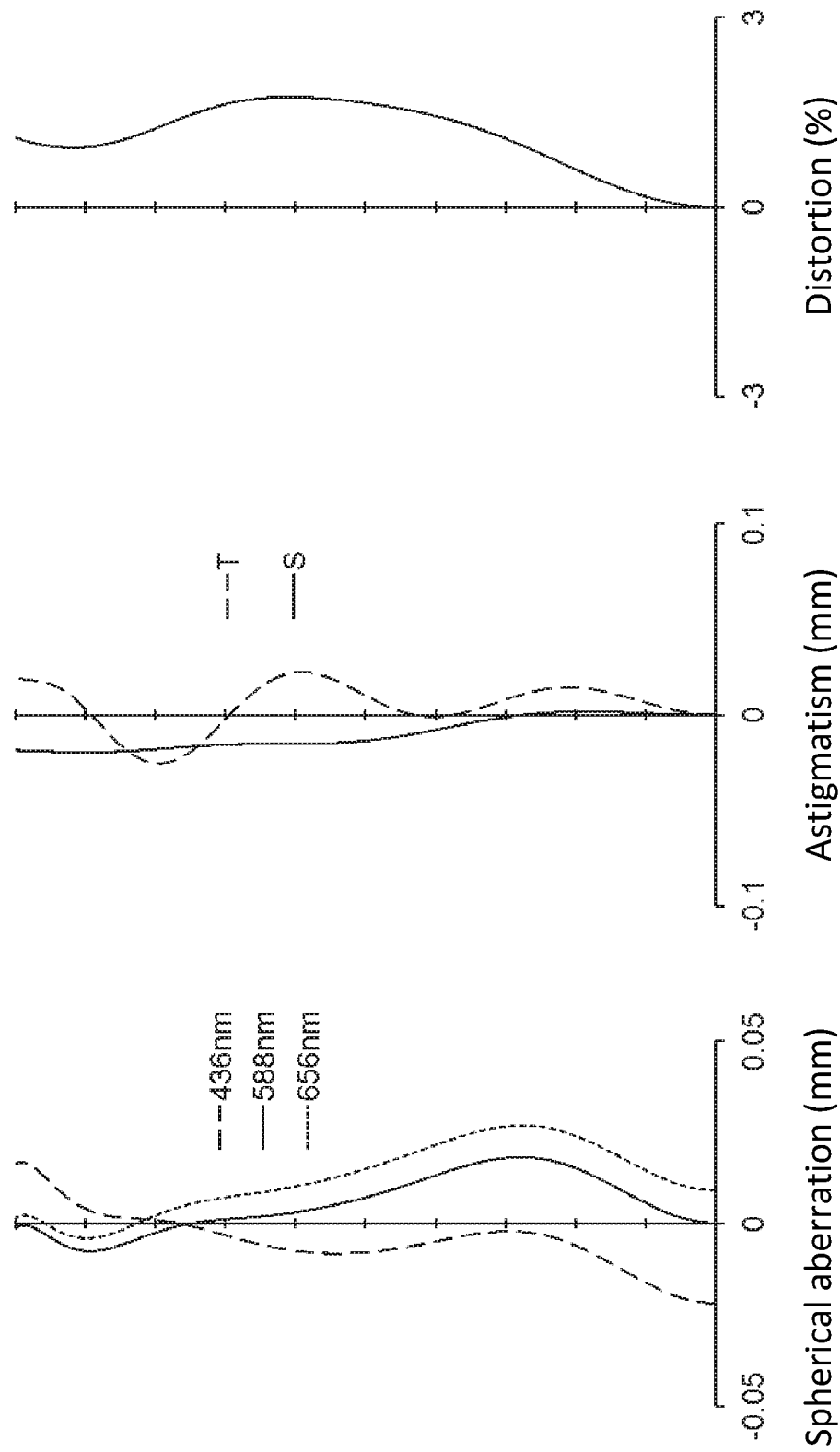
FIG. 21 is an aberration diagram showing a spherical aberration, astigmatism, and a distortion of the imaging lens of FIG. 19.

FIG. 20 shows a lateral aberration that corresponds to the image height ratio H, and FIG. 21 shows a spherical aberration (mm), astigmatism (mm), and a distortion (%), respectively. As shown in FIGS. 20 and 21, according to the imaging lens of Numerical Data Example 7, the aberrations are also satisfactorily corrected.

As described above, according to the imaging lens of the embodiment described above, it is achievable to have very wide angle of view (2ω) of 60° or greater. More specifically, according to Numerical Data Examples 1 to 7, the imaging lenses have wide angles of view of 65.2° to 70.0°. According to the imaging lens of the embodiment, it is possible to take an image over a wider range than that taken by a conventional imaging lens.

Moreover, in these years, with advancement in digital zoom technology, which enables to enlarge any area of an image obtained through an imaging lens by image processing, an imaging element having a high pixel count is often used in combination with a high-resolution imaging lens. In case of such an imaging element with a high pixel count, a light-receiving area of each pixel often decreases, so that an image tends to be dark. According to the imaging lenses of Numerical Data Examples 1 to 7, the Fnos are as small as 1.97 to 2.18. According to the imaging lens of the embodiment, it is achievable to obtain a sufficiently bright image, even when the imaging lens is applied in combination with the high-pixel imaging element described above.

Accordingly, when the imaging lens of the embodiment is mounted in an imaging optical system, such as cameras built in portable devices including cellular phones, smartphones, and portable information terminals, digital still cameras, security cameras, vehicle onboard cameras, and network cameras, it is possible to attain both high performance and downsizing of the cameras.

The present invention is applicable to an imaging lens to be mounted in relatively small cameras, such as cameras to be built in portable devices including cellular phones, smartphones, and portable information terminals, digital still cameras, security cameras, vehicle onboard cameras, and network cameras.

The disclosure of Japanese Patent Application No. 2016-096676, filed on May 13, 2016, is incorporated in the application by reference.

While the present invention has been explained with reference to the specific embodiment of the present invention, the explanation is illustrative and the present invention is limited only by the appended claims.

What is claimed is:

1. An imaging lens comprising in order from an object side to an image plane side:
a first lens having positive refractive power;
a second lens having positive refractive power;
a third lens;
a fourth lens;
a fifth lens; and
a sixth lens, arranged in this order from an object side to an image plane side,
wherein said imaging lens has a total of six lenses, with spaces in between each adjacent pair of the lenses,
said second lens is formed in a shape of a meniscus lens near an optical axis thereof,
said third lens is formed in a shape so that at least one surface thereof is aspheric,
said fourth lens is formed in a shape so that at least one surface thereof is aspheric,
said fifth lens is formed in a shape so that a surface thereof on the object side is convex toward the object side near an optical axis thereof,
said sixth lens is formed in a shape so that two surfaces thereof are aspheric and the surface thereof on the image plane side is convex toward the image plane side near an optical axis thereof, and
said second lens has an Abbe's number vd2 so that the following conditional expression is satisfied:

$$35<vd2<75.$$

2. The imaging lens according to claim 1, wherein said sixth lens has the surface on the image plane side having a curvature radius R6r so that the following conditional expression is satisfied:

$$-10<R6r/f<-1,$$

where f is a focal length of a whole lens system.

3. The imaging lens according to claim 1, wherein said fourth lens is formed in a shape so that a surface thereof on the object side has a curvature radius R4f and a surface thereof on the image plane side has a curvature radius R4r so that the following conditional expression is satisfied:

$$0.5<|R4f/R4r|<2.0.$$

4. The imaging lens according to claim 1, wherein said third lens is arranged to be away from the fourth lens by a distance D34 on an optical axis thereof so that the following conditional expression is satisfied:

$$0.05<D34/f<0.2,$$

where f is a focal length of a whole lens system.

5. The imaging lens according to claim 1, wherein said fourth lens is arranged to be away from the fifth lens by a distance D45 on an optical axis thereof so that the following conditional expression is satisfied:

$$0.02<D45/f<0.2,$$

where f is a focal length of a whole lens system.

6. The imaging lens according to claim 1, wherein said fifth lens is arranged to be away from the sixth lens by a distance D56 on the optical axis thereof so that the following conditional expression is satisfied:

$$0.05<D56/f<0.2,$$

where f is a focal length of a whole lens system.

7. The imaging lens according to claim 1, wherein said fifth lens has a thickness T5 along the optical axis thereof and said sixth lens has a thickness T6 along the optical axis thereof so that the following conditional expression is satisfied:

$0.5 < T5/T6 < 3.0$.

* * * * *